US007013332B2

(12) United States Patent
Friedel et al.

(10) Patent No.: US 7,013,332 B2
(45) Date of Patent: Mar. 14, 2006

(54) DISTRIBUTED POLICY MODEL FOR ACCESS CONTROL

(75) Inventors: Guy Friedel, Bellevue, WA (US); Ariel Katz, Redmond, WA (US); Yaron Shamir, Zichron Yaacov (IL); Abraham Nathan, Haifa (IL)

(73) Assignee: Microsoft Corporation, Redmond, WA (US)

( * ) Notice: Subject to any disclaimer, the term of this patent is extended or adjusted under 35 U.S.C. 154(b) by 739 days.

(21) Appl. No.: 09/681,106

(22) Filed: Jan. 9, 2001

(65) Prior Publication Data

US 2002/0138631 A1 Sep. 26, 2002

(51) Int. Cl.
*G06F 15/173* (2006.01)

(52) U.S. Cl. ...................... 709/223; 709/224; 709/225; 713/201; 707/10

(58) Field of Classification Search ........ 709/223–225, 709/229; 713/201; 707/3, 10, 200
See application file for complete search history.

(56) References Cited

U.S. PATENT DOCUMENTS

| | | | | |
|---|---|---|---|---|
| 5,787,427 | A * | 7/1998 | Benantar et al. | 707/9 |
| 5,911,143 | A * | 6/1999 | Deinhart et al. | 707/103 R |
| 5,991,877 | A * | 11/1999 | Luckenbaugh | 713/200 |
| 6,466,932 | B1 * | 10/2002 | Dennis et al. | 707/3 |
| 6,647,388 | B1 * | 11/2003 | Numao et al. | 707/9 |
| 6,708,276 | B1 * | 3/2004 | Yarsa et al. | 713/201 |
| 6,718,380 | B1 * | 4/2004 | Mohaban et al. | 709/223 |
| 2002/0002684 | A1 * | 1/2002 | Fox et al. | 713/200 |
| 2003/0023587 | A1 * | 1/2003 | Dennis et al. | 707/3 |

OTHER PUBLICATIONS

T.C. Ting, S.A> Demurjian and M.Y. Hu, Requirements, Capabilities and Functionalities of User-Role Based security for an Object-Oriented Design Model, Jun. 25, 1997, pp. 275-296.*

Dirk Jonscher, Extending access control with duties—realized by active mechanisms, Jun. 25, 1997, pp. 91-111.*

Greenwald, A new security policy for distributed resource management and access control, Proceedings of the UCLA conference on New security paradigms workshops Sep. 17-20, 1996, Lake Arrowhead, CA USA.

Nevex Policy Suite, Technical Brief, http://www.nevex.com/Technical%20Brief.html, date unknown.

* cited by examiner

*Primary Examiner*—Ario Etienne
*Assistant Examiner*—LaShonda Jacobs
(74) *Attorney, Agent, or Firm*—Lee & Hayes, PLLC

(57) ABSTRACT

A distributed policy model for access control is disclosed. In an enterprise-only mode, each node within a networking environment has its resource access governed by the same enterprise-wide policy. The enterprise-wide policy is set through creation of one or more enterprise policy objects. In an integrated mode, nodes are organized in a number of arrays. Each array has an array-wide policy set through creation of an array policy object. Each array-wide policy initially inherits the enterprise-wide policy. Additional resource access and protocol use restrictions can be added to the individual array-wide policies. In an array-only mode, each array has an array-wide policy also set through creation of an array policy object, but the policy does not necessarily initially inherit an enterprise-wide policy. In a stand-alone mode, a single server has its own policy.

21 Claims, 12 Drawing Sheets

250
252 CREATE ENTERPRISE POLICY OBJECT
254 SET ENTERPRISE POLICY
256 CREATE ARRAY POLICY OBJECTS
258 INHERIT ARRAY POLICIES FROM ENTERPRISE POLICY
260
262 ADJUST ARRAY POLICIES (OPTIONAL)

Figure 4:
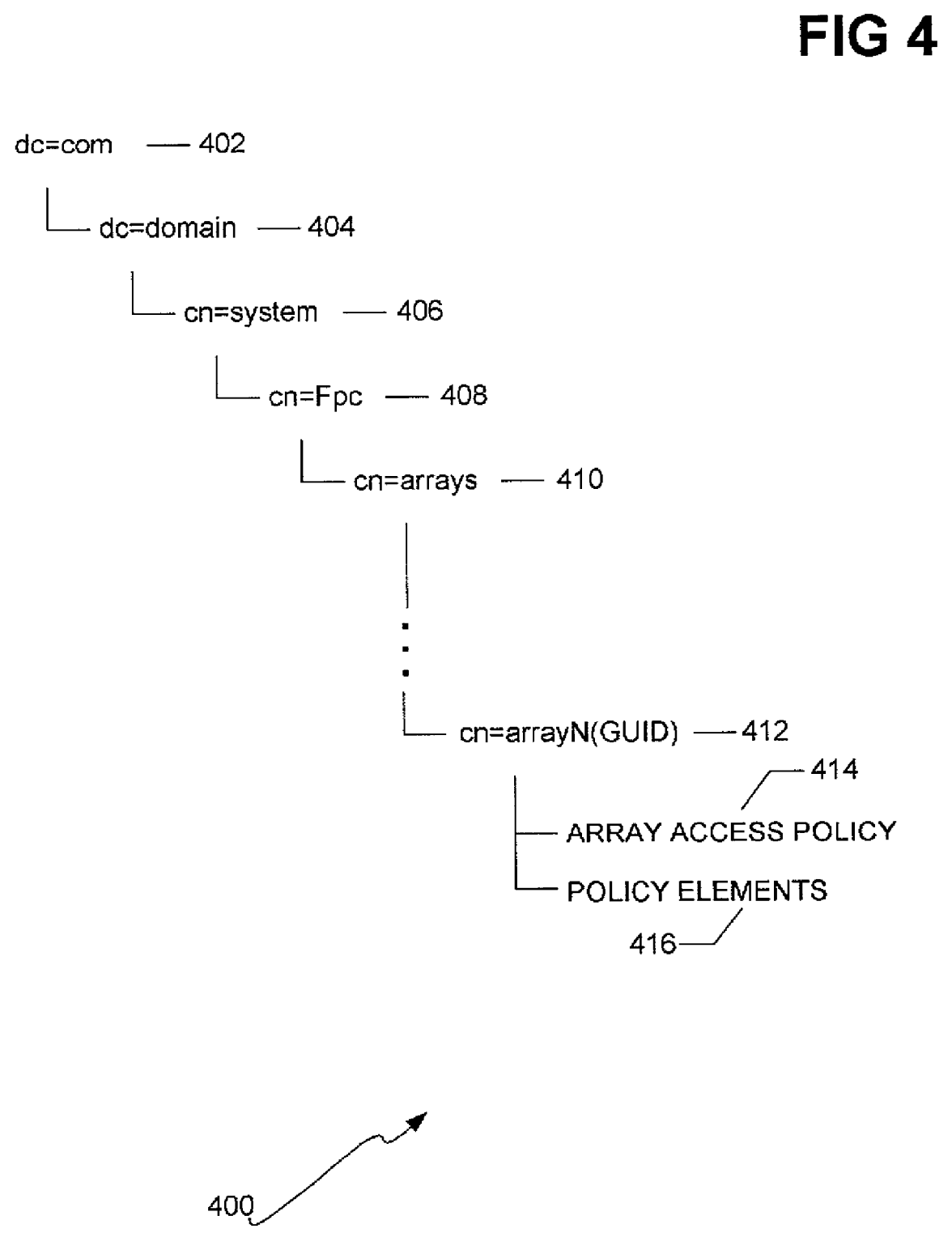

FIG 4 dc=com — 402
dc=domain — 404
cn=system — 406
cn=Fpc — 408
cn=arrays — 410
cn=arrayN(GUID) — 412
414
ARRAY ACCESS POLICY
POLICY ELEMENTS
416
400

FIG 5

START
601
604
DENY
YES
EXPLICITLY DENIED?
602
ENTERPRISE RULE EVALUATION
NO
NO
EXPLICITLY ALLOWED?
606
YES
610
ALLOW
NO
ARRAY POLICY?
608
YES
ARRAY RULE EVALUATION
NO
EXPLICITLY DENIED?
612
YES
600

DISTRIBUTED POLICY MODEL FOR ACCESS CONTROL

BACKGROUND OF INVENTION

This invention relates generally to controlling access to resources such as the Internet, and more specifically to a distributed policy model for controlling such access.

The networking of computers and other resources has become increasingly complicated. Within a large corporation, for example, there may be a number of different intranets for internal access to resources, as well as a number of different extranets for external access to internal resources. Different intranets and extranets may have different levels of access to their resources, and different resources may themselves have different access permissions. Access to and from the Internet may also be governed differently within a complex networking environment.

Resources typically are network elements, such as servers, clients, printers, and the like. The network elements are generally referred to as nodes. The setting of access policy for resources as is described herein is with respect to governing the behavior of users and client computers with respect to the resources. For example, access policy can relate to managing how users access servers on the internet. Therefore, as used herein, resource access means access to one or more resources by users and client computers, as identified by networking addresses, such as Internet Protocol (IP) addresses. Controlling resource access means governing how the users can access these resources. For example, a user may only be allowed to access certain web sites on the Internet, be allowed to access only certain servers, be allowed to only print to certain network printers, and so on.

There are two traditional models for setting access policy for resources. First, there is a one-size-fits-all approach, in which all resources are governed by the same access policy. This approach does not function well in a complex networking environment, however. Different resources may have different access needs, which are not accommodated by a policy that is the same for all resources or for all users of these resources. This approach is advantageous for the network administrator, who can easily administer a single policy for the entire network, but is disadvantageous for the resources, because they have the same policy applied to them, regardless of their individual requirements. This approach can be referred to as not sufficiently granular, in that access policy is an all-or-nothing affair.

Second, there is a by-resource approach, in which each resource is governed by a separate policy. Management of access policy in such a case is overly difficult and administrator intensive. Each resource must have its access policy set individually. This approach is advantageous for the resources, because they can have individual policies applied to them, depending on their specific requirements. However, it is disadvantageous for the network administrator, who cannot easily administer access policy for the network as a whole. This approach can be referred to as too granular, in that access policy must be set individually, even for like resources. Another problem with this approach is that there may be multiple levels of network administration, and administrators, within the organization, which all must be synchronized to ensure that there is a consistent policy over the organization as a whole.

Some progress in the latter approach has been made in that resources can be grouped together within common policies. However, this improved approach is still lacking. Policies for different groups of resources and users cannot easily be related to one another, and over time likely will diverge even in what should be their common aspects. For example, initially the access policy for a first group may be identical to the access policy for a second group, such that both reflect the general policy for the entire network. Over time, the access policy for each of the groups may be modified as their access needs change. However, there is no way to ensure that the modified policies still accord to the general policy for the entire network. Furthermore, if the general policy for the entire network needs to be modified, this means that the group policies must be individually changed. Therefore, while this approach achieves an intermediate level of granularity as compared to the one-size-fits-all and by-resource approaches, it is still not optimal.

In other words, the prior art does not provide for adequate policy access models in the context of current and future complex network topologies. Current models are either too restrictive that is, not granular enough or too lax that is, too granular in how they approach access policy. Intermediate approaches to access policy achieve some measure of intermediate granularity, but still are difficult with which to administer a cohesive network-wide access policy. For these and other reasons, there is a need for the present invention.

SUMMARY OF INVENTION

The invention relates to a distributed policy model for access control. The policies can be overseen by proxies for servers, nodes, and server arrays. If access is permitted according to a policy, the proxy allows the request. If access is not permitted, the proxy denies the request. The model provides for four policy modes: an enterprise-only mode, an integrated mode, an array-only mode, and a stand-alone mode.

The enterprise-only mode is for centralized, enterprise-wide administration throughout an organization. In the enterprise-only mode, each node within a networking environment has its resource access and protocol use governed by the same enterprise-wide policy. The enterprise-wide policy is set through creation of one or more enterprise policy objects. An enterprise policy object is a data structure that contains access rules that implement the enterprise-wide policy represented by the object, meaning that all proxies within the enterprise will inherit those access rules.

The integrated mode is for a combination of centralized administration, with exceptions at a local level, such as specific deny rules. For example, there may be enterprise-wide administration throughout an organization, with some exceptions at a branch office. In the integrated mode, nodes are organized in one or more arrays of proxies. An array is defined as a group of member servers, administered as a single logical unit for purposes of fault tolerance and improved performance. Each array has an array-wide policy set through creation of an array policy object. Each array-wide policy may initially inherit the enterprise-wide policy. Thereafter, additional resource access restrictions can be added to the individual array-wide policies.

The array-only mode is for decentralized administration in an organization of independent entities. In the array-only mode, each array has an array-wide policy also set through creation of an array policy object. Similar to the enterprise policy object, an array policy object is a data structure that contains access rules that implement the array-wide policy represented by the object. However, the array-wide policies do not initially inherit an enterprise-wide policy and relate to only local set of proxies, such as a set of proxies in a specific domain.

The enterprise-only, integrated, and array-only modes are related to some extent. Each enterprise may have zero or more array policies. If an enterprise has zero array policies, and there is no allowance for adding new array policies, then the enterprise is operating in the enterprise-only mode. Otherwise, the enterprise is operating in the integrated mode. Furthermore, each array may belong to zero or one enterprise policy objects. If an array does not belong to an enterprise policy object, and there is no allowance for it to so belong, then the array is operating in the array-only mode. Otherwise, the array is operating in the integrated mode.

The stand-alone mode is for a single node, which can act as a starting point for wider policy coverage. In the stand-alone mode, a single node, such as a single server, has its own policy, independent of any other server, array, or enterprise policy.

For any policy mode chosen, there are two types of policy object rules, a positive rule type, and a negative rule type. A rule of the positive rule type explicitly allows access to a particular destination and/or use of a particular protocol. More generally, a positive rule allows access to a resource according to one or more parameters. These parameters may be a destination, a user, a client computer networking address, a protocol, a content type, and so on. Conversely, a rule of the negative rule type explicitly denies access based on specific parameters.

In the enterprise-only mode and the integrated mode, the rules of the enterprise-wide policy include rules of the positive rule type, the negative rule type, or both. In the integrated mode specifically, the additional rules of the array-wide policy can only be of the negative rule type in order for the array not to violate the enterprise policy, so an array can only further restrict the enterprise policy. In the array-only mode and the stand-alone mode, the rules of the array-wide policy and of the policy of the single node, respectively, can be of either type, or both. In any mode, a requested access is allowed only where it is explicitly allowed by at least one of the rules and not explicitly denied by any of the rules.

The enterprise-only mode provides for centralized administration of access policy, whereas the array-only mode and the stand-alone server mode provide for distributed administration of access policy. The integrated mode provides for basic centralized administration, with an further administrator tuning at the array level. The integrated mode in particular provides for varying degrees of granularity in setting access policy. Overall access policy at the enterprise level is set with the enterprise-wide policy. Further access restrictions can then be set at the array level, with individual array-wide policies. In this way, the invention provides for the ability to administer a cohesive network-wide access policy, as well as individual array access policies, in distinction to the prior art.

In addition to the embodiments, aspects, and advantages described in the summary, other embodiments, aspects, and advantages of the invention will become apparent by reading the detailed description and by referencing the drawings.

BRIEF DESCRIPTION OF DRAWINGS

FIG. 1(*b*) is a flowchart showing how one embodiment implements the array-only mode of FIG. 1(*a*).

FIG. 2(*b*) is a diagram showing how multiple arrays can share the same policy to avoid duplication and reduce administrative overhead of creating multiple equivalent policies.

FIG. 2(*c*) is a flowchart showing how one embodiment implements the enterprise-only mode and the integrated mode of FIG. 2(*a*).

FIG. 3(*b*) is a flowchart showing how one embodiment implements the node-, or server-, only mode of FIG. 3(*a*).

FIG. 4 is a diagram showing one embodiment of an array policy object that can be used in the array-only mode of FIG. 1(*a*) or the integrated mode of FIG. 2(*a*), and how the object is stored within a directory structure. The relationship between the array policy object and the directory structure is described more specifically in the detailed description.

FIG. 5 is a diagram showing one embodiment of an enterprise policy object that can be used in the enterprise-only mode or the integrated mode of FIG. 2(*a*), and how it is stored within a directory structure. The relationship between the enterprise policy object and the directory structure is described more specifically in the detailed description.

DETAILED DESCRIPTION

Figure 1A:
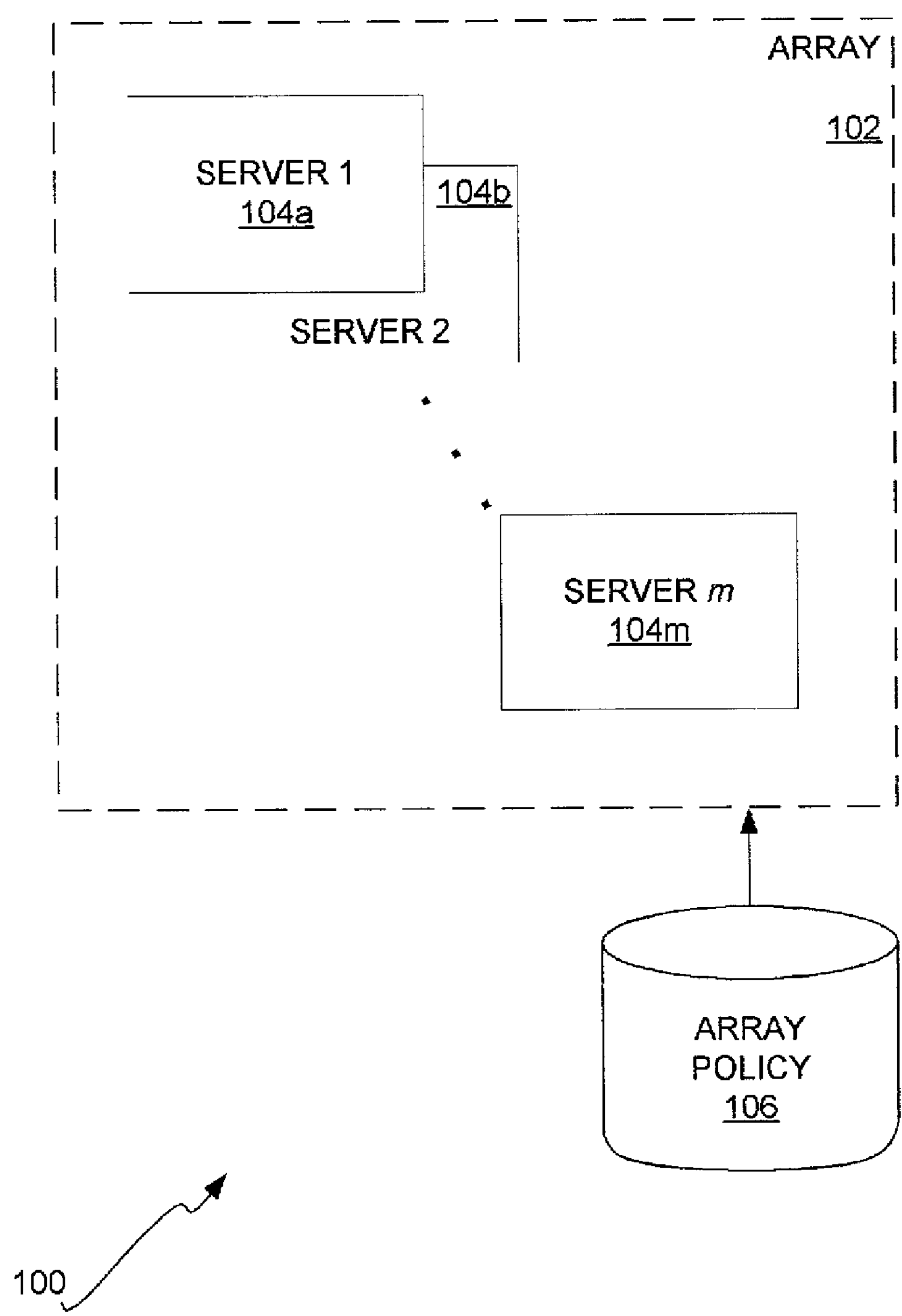
FIG. 1(*a*) is a diagram showing an array-only mode of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, and other changes may be made without departing from the spirit or scope of the present invention. The following detailed description is, therefore, not to be taken in a limiting sense, and the scope of the present invention is defined only by the appended claims.

Policy Modes

The invention provides for different access policy modes: an array-only mode, an enterprise-only mode, an integrated mode, and a stand-alone mode. FIG. 1(*a*) shows a diagram 100 of the array-only mode. An array is defined as a logical collection of servers to which the same resource access policy applies. A resource is defined as a destination on any network to which nodes connected to servers within the array may desire access. The identity of the client may itself also be important to determine if access should be allowed. A resource may be a server within the network, a server on the Internet locatable by a Universal Resource Locator (URL) address, and so on. A protocol is the scheme used to communicate with a resource. For example, a protocol can be the hypertext transport protocol (HTTP), the file transfer protocol (FTP), the simple mail transport protocol (SMTP), as well as other protocols.

The diagram 100 shows an array 102 made up of servers 104*a*, 104*b*, . . . , 104*m*. An array policy object 106 defines the resource access policy for all the servers 104*a*, 104*b*, . . . , 104*m* within the array 102. The array policy object 106 is a data entity, such as a software object or component, that is stored somewhere on the network. For example, the object 106 may be stored within a directory structure for the network. The policy defined by the object 106 applies to all the servers within the array 102 equally. Changes to the policy in the object 106 therefore apply to any node that connects to any network resource via one of the servers 104*a*, 104*b*, . . . , 104*m* for resource access. It is noted that the servers 104*a*, 104, . . . , 104*m* function as proxies. They are not the actual resources that a client attempts to access. Rather, the servers are decision points as to whether to allow such access and forward the requests.

FIG. 1(*b*) shows a flowchart of a method 150 that one embodiment performs to implement the array-only mode. An array policy object is first created for a given array (152). Next, the array policy is set for this array(154). The array-only mode provides for distributed administration of resource access and protocol use policy. Each array has its own policy. These policies do not depend on one another, but rather are independent to each other.

Figure 2A:
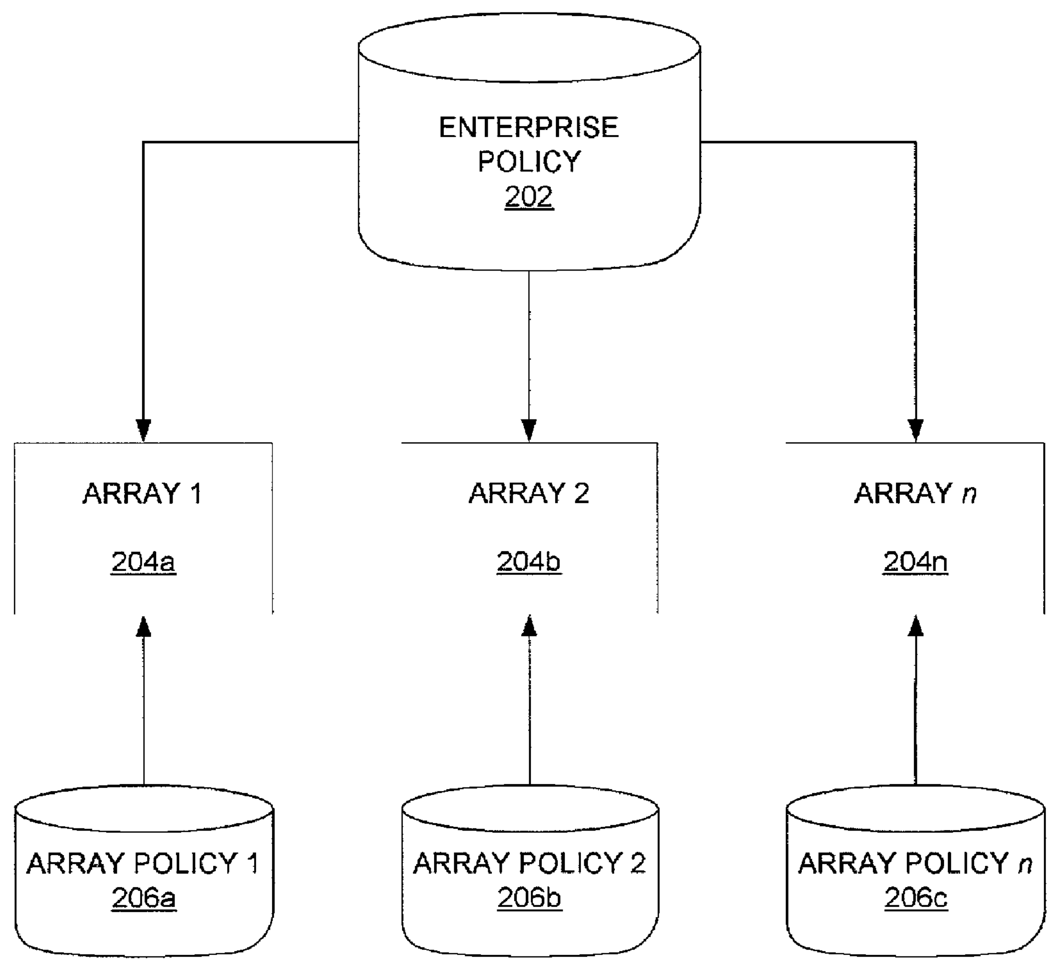
FIG. 2(*a*) is a diagram showing an enterprise-only mode and an integrated mode of the invention.
Figure 2B:
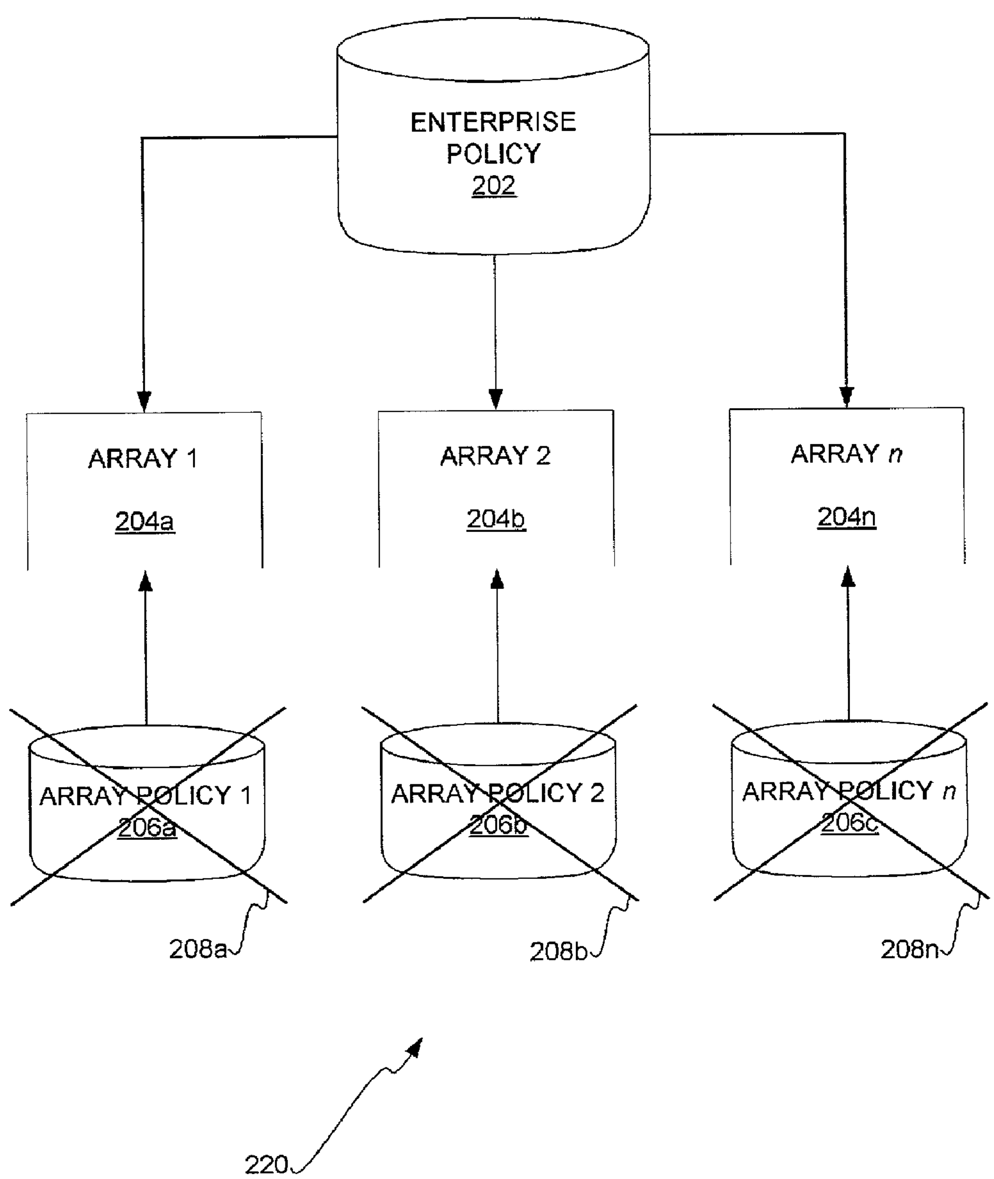

FIG. 2(*a*) shows a diagram 200 of an enterprise-only mode or an integrated mode. An enterprise policy object 202 at least initially defines the resource access and protocol use policy for all the servers within the arrays 204*a*, 204*b*, . . . , 204*n*. In the enterprise-only mode specifically, the individual array-wide policies defined in the array policy objects 206*a*, 206*b*, . . . , 206*n* cannot be modified from their inheritance of the enterprise-wide policy defined in the enterprise policy object 202.

However, in the integrated mode, the individual array-wide policies can be further modified after their inheritance of the enterprise-wide policy. In particular, further resource access and protocol use restrictions may be added to the array-wide policies. This is accomplished by the array policy objects 206*a*, 206*b*, . . . , 206*n*, corresponding to the arrays 204*a*, 204*b*, . . . , 204*n*, respectively, inheriting the policy defined in the enterprise policy object 202.

The enterprise-only mode provides for the advantages of avoiding duplication of policies, and reducing administrative overhead in creating and maintaining a number of equivalent policies. This is shown in the diagram 220 of FIG. 2(*b*). Without the enterprise policy object 202, the array policy objects 206*a*, 206*b*, . . . , 206*n*, are required for setting the policies for the arrays 204*a*, 204*b*, . . . , 204*n*, respectively. This is the case even if the policies for these arrays are meant to be identical. Each of the policies must be individually created and maintained.

However, with the enterprise policy object 202, the array policy objects 206*a*, 206*b*, . . . , 206*n*, are not needed, as indicated in FIG. 2(*b*) by the x's 208*a*, 208*b*, . . . , 208*n*, respectively. This means that only one policy, corresponding to the enterprise policy object 202, is needed for setting the policies for the arrays 204*a*, 204*b*, . . . , 204*n*. This is the only policy that needs to be created and maintained. Another advantage is that potential inconsistency among the policies for the arrays 204*a*, 204*b*, . . . , 204*n*, is avoided, because all the arrays receive their policy from the enterprise policy object 202, instead of from the individual array objects 208*a*, 208*b*, . . . , 208*n*.

FIG. 2(*c*) shows a flowchart of a method 250 that one embodiment performs to implement the enterprise-only mode or the integrated mode. An enterprise policy object is first created (252), and the enterprise-wide policy is set for this object (254). The array policy object for the server arrays is optionally created (256). The array-wide policies are optionally inherited from the enterprise-wide policy (258). As changes are made to the enterprise-wide policy, they automatically are inherited by the array-wide policies. This provides for centralized administration of resource access and protocol use policies. The performance of the method 250 above the dotted line 260 represents implementation of the enterprise-only mode. No individual changes can be made to the array-wide policies. They can only inherit changes from the enterprise-wide policy.

Conversely, the additional performance of the method 250 below the dotted line 260 represents implementation of the integrated mode. The individual array-wide policies of the array policy objects can be adjusted (262). That is, additional resource access and protocol use restrictions can be added to the array-wide policies, independent of the enterprise-wide policy. This provides for distributed adjustment of the resource access and protocol use policies at the array level, while still providing for centralized administration of policies at the enterprise level. 262 is labeled as optional in FIG. 2(*c*) because it is not performed in the enterprise-only mode.

Finally, FIG. 3(*a*) shows a diagram 300 of a stand-alone mode. The server policy object 304 defines the resource access and protocol use policy for an individual server 302. The server 302 functions as a proxy for incoming requests. FIG. 3(*b*) shows a flowchart of a method 350 that one embodiment performs to implement the stand-alone mode. A server policy object is first created (352), and the server policy is set for this object (354). The stand-alone mode provides for distributed administration of policy at the most granular level. It can be used in situations where the server may not be organized within a directory structure for the network, but rather lies outside of the directory. The stand-alone mode is also used in a scenario where there is a small number of clients, and a single proxy server that governs access to resources by the clients, such as in a small business networking environment. The server policy does not depend on any other policy, but instead is an independent policy.

Policy Objects, Policy Rules, and Policy Elements

The various policy objects can be stored and organized as data entities within a directory. For example, the directory may be an Active Directory (AD), or another type of directory. A directory is a distributed listing of names, profile information and machine addresses of every user and resource on a network. It is used to manage user accounts and network permissions. For example, when sent a user name, it can return the attributes of that individual, which may include a telephone number as well as an e-mail address. Directories use highly specialized databases that are typically hierarchical in design and provide fast lookups. The various policy objects may also be stored in a specialized database apart from a directory, such as a registry database, in the context of the Microsoft Windows operating system. In an embodiment in which the directory is an AD, the array policy objects in particular are placed in the domain partitions to which the arrays belong. This ensures propagation of the enterprise and array access policies throughout all the member servers of the arrays.

FIG. 4 is a diagram 400 showing one embodiment of the hierarchical directory structure for an array policy object. 402 and 404 indicate domain contexts in which the object is stored. 406, 408, and 410 indicate context names in which the object is stored. 412 is the context name for the array corresponding to the array policy object. 414 specifies the actual access policy rules for a given array policy object. While only one policy object is shown in FIG. 4 (as 414), there can be more than one, if there is more than one array. 416 specifies the policy elements that can be used within the access policies rules, and are shared among all the array policy objects. These policy elements can include destinations, client Internet Protocol (IP) addresses, user identifications (ID's), schedules, as well as other elements.

Figure 5:
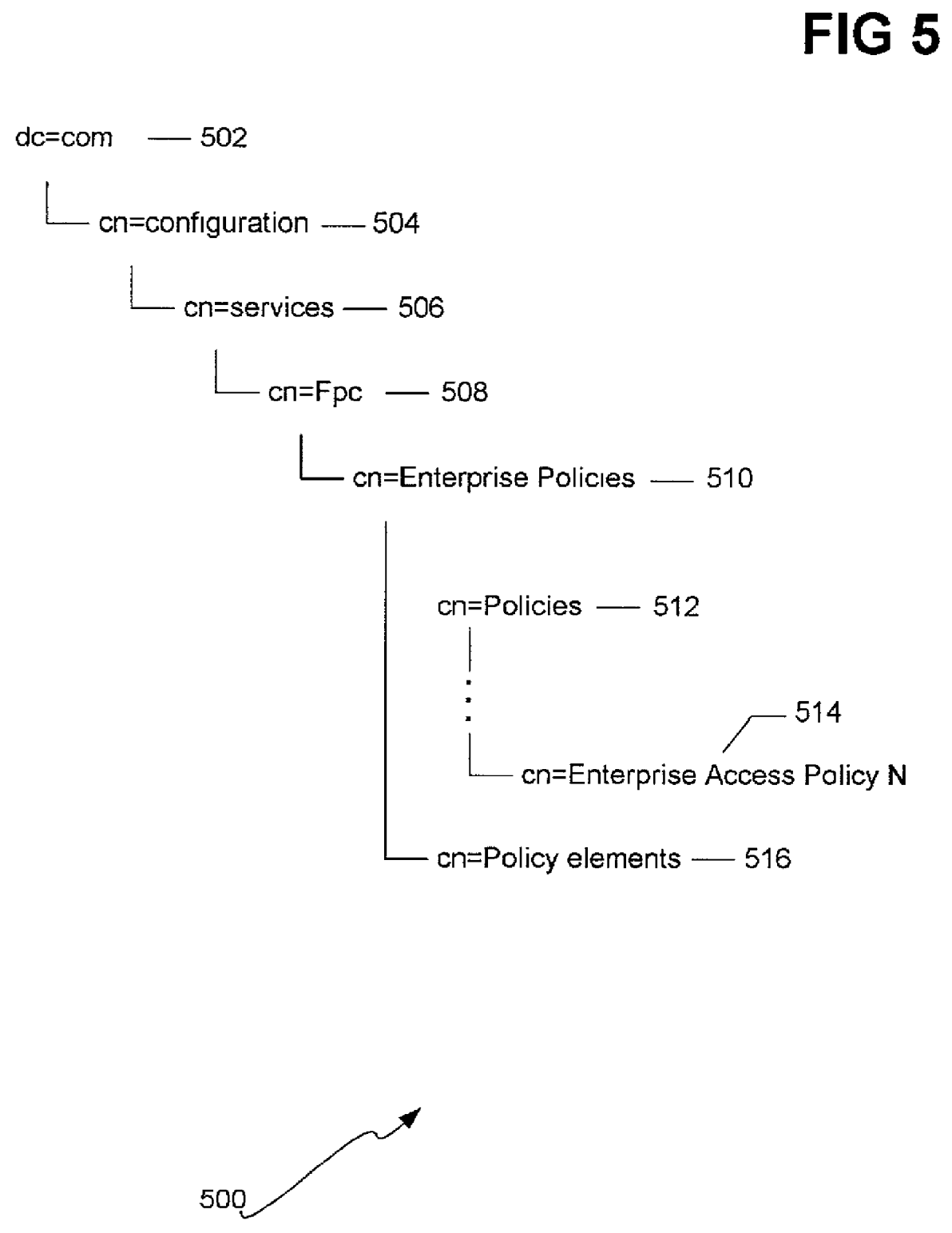

Similarly, FIG. 5 is a diagram 500 showing one embodiment of the hierarchical directory structure for an enterprise policy object. 502 indicates the domain context in which the object is stored. 504, 506, and 508 indicate context names in which the object is stored. 510 is the context name for the enterprise-wide, or forest-wide, policies themselves. The actual policy rules are stored in 512 and 514, where each of 512 and 514 specify a separate enterprise policy object. 516 specifies the policy elements that can be used within the policy rules, and are shared among all the enterprise policy objects.

A policy is made up of a number of rules, where each rule is specified using one or more policy elements. For example, there may be two types of rules: resource access rules, also referred to as site and content rules, and protocol rules. The former rules define which clients, or other nodes, can access which destinations, at what schedules. The latter rules define which protocols are allowed for use, by which clients, or other nodes, at which schedules. A rule of either type can be a positive rule, which allows access if the rule applies to a given request (assuming no negative rule also applies), or a negative rule, which denies access if the rule applies to a given request.

Policy elements include schedules, destination sets, client address sets, users and groups, protocol definitions, and content groups, and so on. Schedules are time periods, such as lists of hours during the week. Destination sets are resources that may be indicated by name, an example being www.destination.com, or Internet Protocol (IP) address, an example being 191.168.0.168. Client address sets, or node address sets, are groups of clients defined by IP address ranges. Users and groups are individual users that can access the resources, and groups of users that can access the resources, respectively. Protocol definitions are the protocols, which can be defined by primary and secondary ports. A protocol itself specifies the format in which data is packaged and transported. Content groups are categories of multipurpose Internet mail extensions (MIME) types.

Site and content rules can be specified using destination sets, schedules, client address sets, users and groups, and content groups. For example, a site and content rule may specify that certain clients, as indicated in a client address set, cannot access given destinations, as indicated in a destination set. Protocol rules can be specified using protocol definitions, schedules, users and groups, and client address sets. For example, a protocol rule may specify that a certain group of users, as specified in the users and groups, can use a given protocol, as specified in the protocol definitions.

In the array-only mode, the rules within the array-wide policy for a given array can include both positive and negative rules. In the enterprise-only mode, the rules within the enterprise-wide policy can also include both positive and negative rules. In the integrated mode, whereas the enterprise-wide policy can include both positive and negative rules, any rules added to the array-wide policies after inheritance of the enterprise-wide policy can only be negative rules. In the stand-alone mode, the rules within the server-wide policy can include both positive and negative rules.

Rules Evaluation Process

Figure 6:
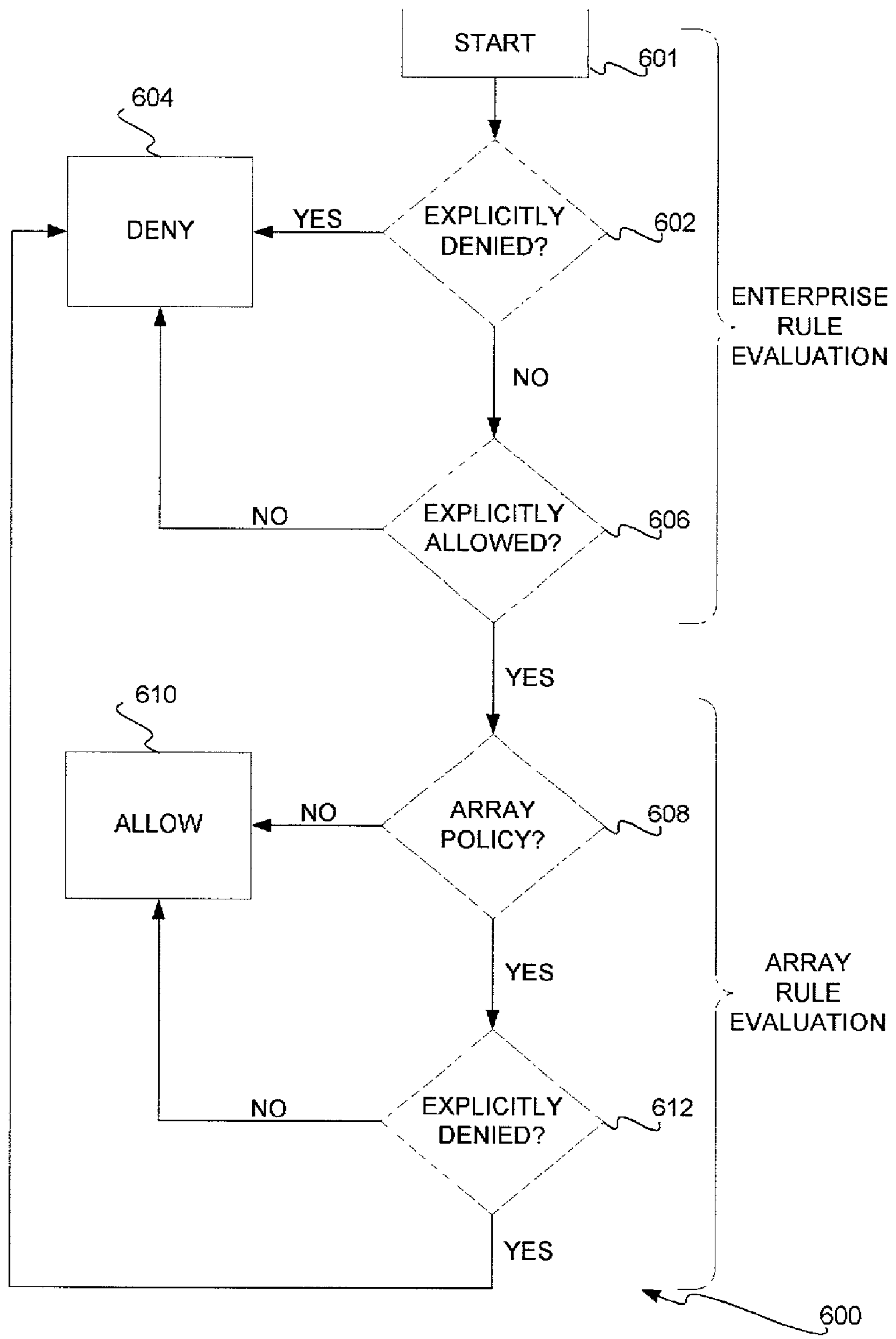
FIG. 6 is a flowchart showing how policy rules are evaluated in the enterprise-only mode and the integrated mode of FIG. 2(*a*).

FIG. 6 shows a flowchart of a method 600 that one embodiment performs to evaluate policy rules in the enterprise-only and the integrated modes. The policy rules are evaluated against a given request. The request may include a requested access to a particular destination via a requested protocol, from a particular user. In general, a request is allowed only if it is not explicitly denied and is explicitly allowed. The method 600 starts at 601 with an incoming request. First, the request is evaluated against the enterprise-wide policy. If the request is explicitly denied in the enterprise-wide policy (602), then the request itself is denied (604). Furthermore, if the request is not explicitly allowed by the enterprise-wide policy (606), then the request is also denied (604).

Second, the request is evaluated against additional rules within a specific array-wide policy, if there are any. In the enterprise-only mode, there are no array-wide policies that have rules that augment the rules of the enterprise-wide policy, such that the method proceeds from 608 to 610, where the request is allowed. That is, in the enterprise-only mode, once it has been determined that the request is not explicitly denied (602), and is explicitly allowed (606), because there are no additional array-wide rules (608), the request is allowed (610).

In the integrated mode, there may be array-wide policies that have rules, which augment the rules of the enterprise-wide policy. In particular, these additional, or new, rules are restrictive, or negative, rules. In such situations, the method proceeds from 608 to 612. If the additional rules of the array-wide policies that augment the rules of the enterprise-wide policy explicitly deny access (612), then the request is denied (604). Otherwise, the request is allowed (610).

Therefore, in the integrated mode, a request that is not explicitly denied in the enterprise-wide policy (602), and is explicitly allowed in the enterprise-wide policy (606), may still be denied. This is because the additional rules of the array-wide policy (608) may explicitly deny the request (612), such that the request is still denied (604). Conversely, in the enterprise-only mode, a request that is not explicitly denied by the enterprise-wide policy (602), and is explicitly allowed in the enterprise-wide policy (606), is always allowed (610). This is because there are no additional rules in the array-wide policy (608), such that the request is allowed (610).

Figure 7:
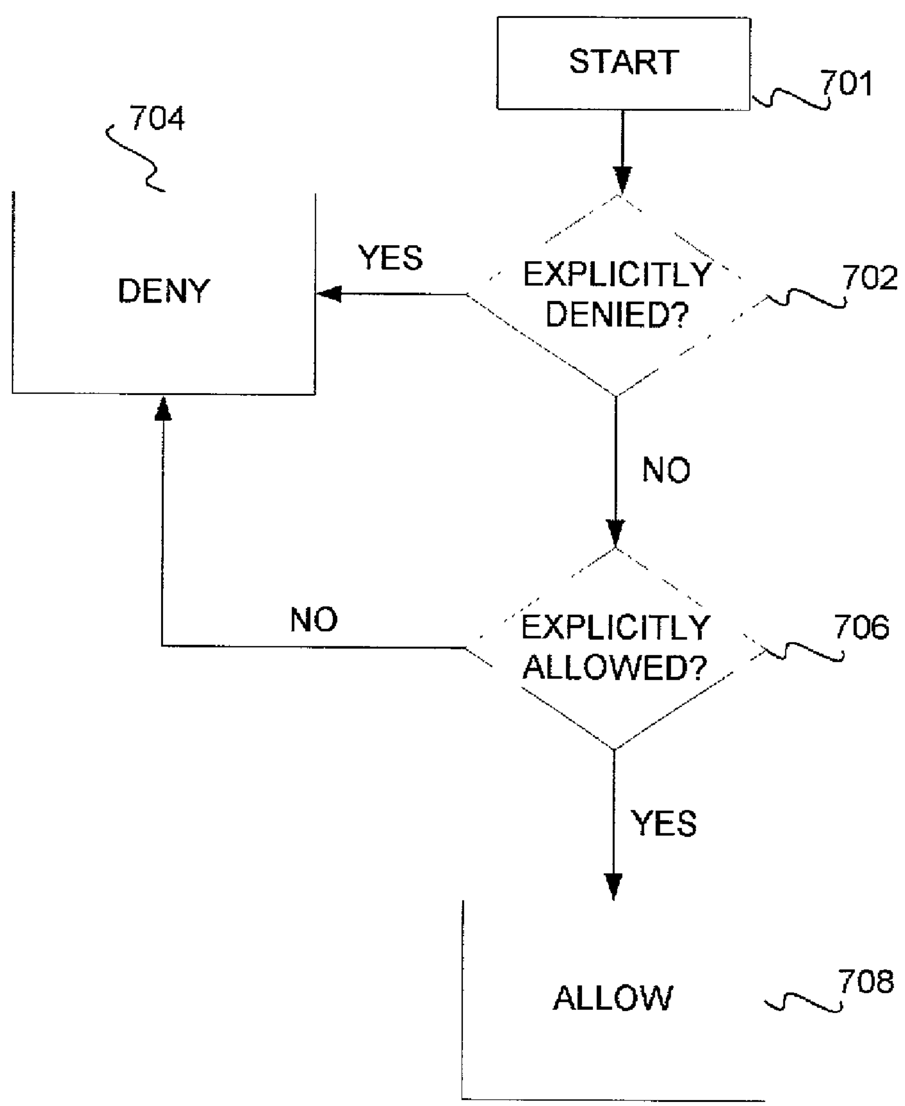
FIG. 7 is a flowchart showing how policy rules are evaluated in the array-only mode of FIG. 1(*a*) or the stand-alone mode of FIG. 3(*a*).
Figure 7:
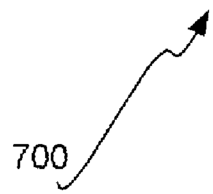

FIG. 7 shows a flowchart of a method 700 that one embodiment performs to evaluate policy rules in the array-only and the stand-alone modes. The method 700 starts at 701 with an incoming request. The policy rules are evaluated against the request. Like the enterprise-only and integrated modes, a request is allowed only if it is not explicitly denied and is explicitly allowed. If the request is explicitly denied in the array-wide or server-wide policy (702), then the request itself is denied (704). Furthermore, if the request is not explicitly allowed by the array-wide or server-wide policy (706), then the request is also denied (604). Only if the request is not explicitly denied (702) and is explicitly allowed (706), is the request allowed (708).

Default Case and Security Model

In the default case of the invention, one enterprise policy object is defined as the default enterprise policy. This means that when a new array is created in either the enterprise-only mode, or the integrated mode, the new array belongs to the default enterprise policy object unless otherwise specified. It is possible for the enterprise administrator to change between policy modes at any time. However, any change causes the previous policy to be deleted, to prevent possible inconsistencies between the old policy rules and new policy rules. The previous policy is the policy of all the arrays that was inherited from the enterprise policy. This scenario, however, is only one example. Other implementations can assume, for example, that the array-only mode is the default, such that the policy of the arrays is not deleted once they are changed.

The invention also provides for a security model, to ensure that the enterprise policy objects are secure against network administrators who only have access to array policy objects. For example, an enterprise network administrator may set an enterprise policy that is applicable to the entire network. There may then be several array, or domain, network administrators that further refine the enterprise policy as it is applied to a particular array, or domain. Furthermore, each enterprise policy object can be secured, allowing multiple enterprise network administrators. In this case, each enterprise network administrator may control different sets of arrays. Furthermore, each array policy object can be secured. This allows for each (domain) network administrator to secure his or her own arrays against access by others, ensuring that the administrator has exclusive control for a specific array policy.

The following table shows the security permissions for an array policy object, in one particular embodiment of the invention.

[t1]

| Access Permission | Meaning | Initialization |
|---|---|---|
| READ | Allows the user to view all array information without modifying it | Allow everyone |
| WRITE | Allows the user to write and create array information | Allow domain (array) administrators group |
| CHANGE (READ + WRITE) | Includes read/write, create/delete.Allows the user to read and write array data | Allow domain (array) administrators group |
| WRITE OWNER | Assign user or group who owns the object. The owner of an object can change the access permissions for the object | Allow domain (array) administrators group |
| WRITE DAC (Discretionary Access Control) | Assign user or group who can change the access permissions for the array objects | Allow domain (array) administrators group |
| CHANGE SACL (System Access Control List) | Allows the admin to define who can modify the array objects SACLs to configure audit events | Allow domain (array) administrators group |

The final table shows the security permission for an enterprise policy object.

[t2]

| Access Permission | Meaning | Initialization |
|---|---|---|
| READ | Allows the user to view all enterprise object information without modifying it. | Allow everyone |
| WRITE | Allows the user to write enterprise object information | Allow enterprise administrators group |
| CHANGE (READ + WRITE) | Includes read/write, create/delete.Allows the user to read and write data to all descendant objects. E.g., add an enterprise protocol definition. | Allow enterprise administrators group |
| WRITE OWNER | Assign user or group who owns the object. The owner of an object can change the access permissions for the object. | Allow enterprise administrators group |
| WRITE DAC | Assign user or group who can change the access permissions for the enterprise policy | Allow enterprise administrators group |
| CHANGE SACL | Allows the admin to define who can modify the enterprise policy object's SACL to configure audit events | Allow enterprise administrators group |

Example Computerized Device

Figure 8:
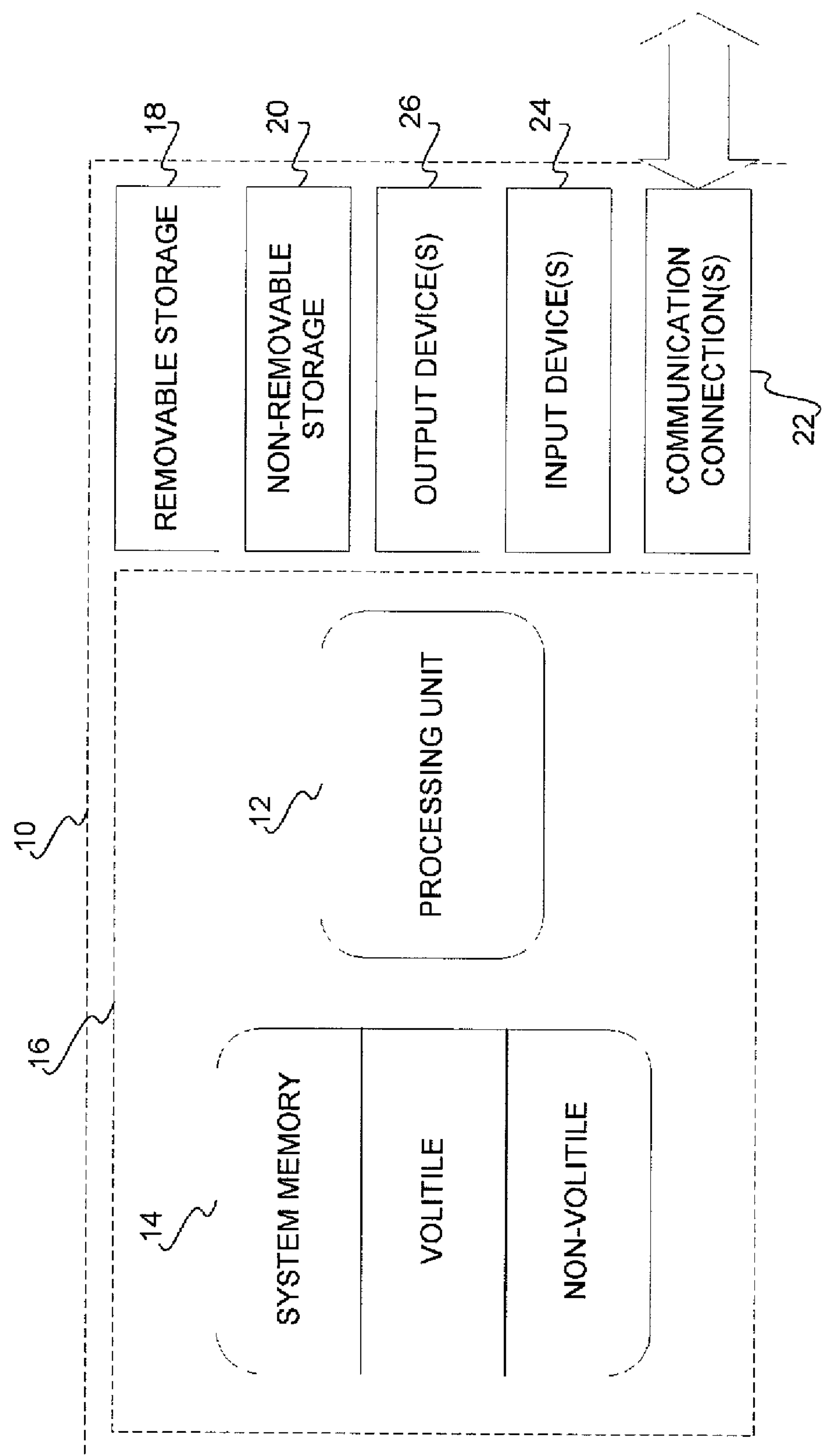
FIG. 8 is a diagram of an example computerized environment in conjunction with which the invention may be implemented.

FIG. 8 illustrates an example of a suitable computing system environment 10 on which the invention may be implemented. The computing system environment 10 is only one example of a suitable computing environment and is not intended to suggest any limitation as to the scope of use or functionality of the invention. Neither should the computing environment 10 be interpreted as having any dependency or requirement relating to any one or combination of components illustrated in the exemplary operating environment 10. In particular, the environment 10 is an example of a computerized device that can implement the servers, clients, or other nodes that have been described.

The invention is operational with numerous other general purpose or special purpose computing system environments or configurations. Examples of well known computing systems, environments, and/or configurations that may be suitable for use with the invention include, but are not limited to, personal computers, server computers, handheld or laptop devices, multiprocessor systems, microprocessor systems. Additional examples include set top boxes, programmable consumer electronics, network PCs, minicomputers, mainframe computers, distributed computing environments that include any of the above systems or devices, and the like.

The invention may be described in the general context of computer instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An exemplary system for implementing the invention includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated by dashed line 16. Additionally, device 10 may also have additional features/functionality. For example, device 10 may also include additional storage (removable and/or non-removable) including, but not limited to, magnetic or optical disks or tape. Such additional storage is illustrated in by removable storage 18 and non-removable storage 20.

Computer storage media includes volatile, nonvolatile, removable, and non-removable media implemented in any method or technology for storage of information such as computer readable instructions, data structures, program modules, or other data. Memory 14, removable storage 18, and non-removable storage 20 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Communications connection(s) 22 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 10 may also have input device(s) 24 such as keyboard, mouse, pen, voice input device, touch input device, etc. Output device(s) 26 such as a display, speakers, printer, etc. may also be included. All these devices are well know in the art and need not be discussed at length here.

The methods that have been described can be computer-implemented on the device 10. A computer-implemented method is desirably realized at least in part as one or more programs running on a computer. The programs can be executed from a computer-readable medium such as a memory by a processor of a computer. The programs are desirably storable on a machine-readable medium, such as a floppy disk or a CD-ROM, for distribution and installation and execution on another computer. The program or programs can be a part of a computer system, a computer, or a computerized device.

Conclusion

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

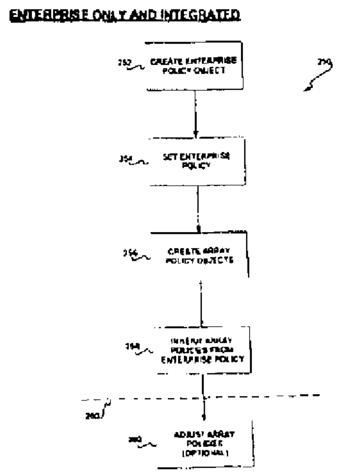

The invention claimed is:

1. A method comprising:

creating an enterprise policy object providing an enterprise-wide policy governing at least one of resource access and protocol use for a plurality of nodes within a networking environment organized within a plurality of arrays;

creating at least one array policy object, each array policy object providing an array-wide policy governing resource access for one or more of the plurality of nodes organized within a corresponding array;

for each of one or more of the at least one array policy object, inheriting an instance of the enterprise-wide policy as the array-wide policy such that the array-wide policy if each array policy object is at least initially set to the enterprise-wide policy;

for each of one of more of the at least one array policy object, adjusting the array-wide policy after the array-wide policy has inherited the enterprise-wide policy;

wherein the enterprise-wide policy includes a plurality of enterprise rules, each enterprise rule governing at least one of access to a particular resource and use of a particular protocol, each enterprise rule having a rule type selected from a positive rule type and a negative rule type, the positive rule type explicitly allowing at least one access and use and the negative rule type explicitly denying at least one of access and use; and wherein each array-wide policy includes a plurality of array rules, the plurality of array rules at least initially equal to the plurality of enterprise rules upon the enterprise-wide policy inherited as each array-wide policy.

2. The method of claim 1, further comprising, for a requested access via a requested protocol by a node organized within one of the plurality of arrays, applying the array-wide policy of the policy object corresponding to the one of the plurality of arrays to determine whether to allow the requested access via the requested protocol, such that the requested access via the requested protocol is allowed only where the requested access via the requested protocol is explicitly allowed by the plurality of rules and not explicitly denied by the plurality of rules;

allowing the requested access via the requested protocol in response to determining that the requested access via the requested protocol is allowed; and, denying the requested access via the requested protocol in response to determining that the requested access via the requested protocol is not allowed.

3. The method of claim 1, wherein adjusting the array-wide policy comprises adding one or more new array rules to the plurality of array rules, each of the new array rules having a negative rule type explicitly denying one of access to a particular resource and use of a particular protocol.

4. The method of claim 3, further comprising, for a requested access via a requested protocol by a node organized within one of the plurality of arrays, applying the array-wide policy of the policy object corresponding to the one of the plurality of arrays to determine whether to allow the requested access via the requested protocol, such that the requested access via the requested protocol is allowed only where the requested access via the requested protocol is explicitly allowed by the plurality of rules and not explicitly denied by the plurality of rules;

allowing the requested access via the requested protocol in response to determining that the requested access via the requested protocol is allowed; and, denying the requested access via the requested protocol in response to determining that the requested access via the requested protocol is not allowed.

5. A computer-readable medium having stored thereon a computer program executable by a processor to perform the method of claim 1.

6. The method of claim 1, wherein the enterprise-wide policy and the array-wide policy are overseen according to one of the plurality of modes comprising:

an enterprise-only mode;

an integrated mode;

an array-only mode; and a stand-alone mode.

7. The method of claim 6 wherein, when overseen according to the integrated mode, each array rule added to the array-wide policy beyond those inherited from the enterprise-wide policy is of the negative rule type.

8. The method of claim 1, wherein the enterprise-wide policy is capable of governing both resource access and protocol use.

9. The method of claim 8, wherein governing protocol use comprises:

allowing the use of at least one protocol; and denying the use of at least one protocol.

10. The method of claim 1, wherein:

the enterprise policy object is secured with a first set of security permissions; and the array policy object is secured with a second set of security permissions.

11. The method of claim 10, wherein each set of policy object security permissions comprises:

a read permission;

a write permission; and a change permission.

12. The method of claim 11, wherein each set of policy object security permissions further comprises:

a write owner permission;

a write discretionary access control permission; and a change system access control list permission.

13. A method comprising:

creating an enterprise policy object providing an enterprise-wide policy governing resource access of a plurality of nodes within a networking environment organized within a plurality of arrays;

creating at least one array policy object, each array policy object providing an array-wide policy governing resource access for one or more of the plurality of nodes organized within a corresponding array;

for each policy object, inheriting an instance of the enterprise-wide policy as the array-wide policy such that the array-wide policy of each array policy object is initially set to the enterprise-wide policy;

for each one or more of the at least one array policy object, adjusting the array-wide policy after the array-wide policy has inherited the enterprise-wide policy;

wherein the enterprise-wide policy includes a plurality of enterprise rules, each enterprise rule govering at least one of access to a particular resource and user of a particular protocol, each enterprise rule having a rule type selected from a positive rule type and a negative rule type, the positive rule time explicitly allowing at least one of access and use and the negative rule type explicitly denying at least one of access and use; and, wherein each array-wide policy includes a plurality of array rules, the plurality of array rules initially equal to the plurality of enterprise rules upon the enterprise-wide policy inherited as each array-wide policy.

14. The method of claim 13, wherein adjusting the array-wide policy comprises adding one or more new array rules to the plurality of array rules, each of the new array rules having the negative rule type.

15. The method of claim 14, further comprising, for a requested access via a requested protocol by a node organized within one of the plurality of arrays, applying the array-wide policy of the policy object corresponding to the one of the plurality of arrays to determine whether to allow the requested access via the requested protocol, such that the requested access via the requested protocol is allowed only where the requested access via the requested protocol explicitly allowed byte plurality of rules and not explicitly denied by the plurality of rules;

allowing the requested access via the requested protocol in response to determining that the requested access via the requested protocol is allowed; and, denying the requested access via the requested protocol in response to determining that the requested access via the requested protocol is not allowed.

16. A computer-readable medium having stored thereon a computer program executable by a processor to perform the method of claim 13.

17. A system for governing resource access among a plurality of nodes within a networking environment, at least some of the plurality of nodes organized within a plurality of arrays, the system comprising:

an enterprise-policy object providing an enterprise-wide policy governing resource access for nodes organized within at least one of the plurality of arrays; and, at least one array policy object, each array policy object providing an array-wide policy governing resource access for nodes organized within the corresponding array, one or more of the at least one array policy object inheriting an instance of the enterprise-wide policy as the array-wide policy such that the array-wide policy is at least initially set to the enterprise-wide policy;

wherein the array-wide policy provided by each of the at least one array policy object other than the one or more of the at least one array policy object inheriting the enterprise-wide policy does not inherit the enterprise-wide policy;

wherein the enterprise-wide policy includes a plurality of enterprise rules, each enterprise rule governing at least one of access to a particular resource and use of a particular protocol, each enterprise rule having a rule type selected from a positive rule type and a negative rule type, the positive rule type explicitly allowing at least one of access and use and the negative rule type explicitly denying at least one of access and use;

wherein the array-wide policy provided by each of the one or more of the least one array policy object includes a plurality of first array rules at least initially equal to the plurality of enterprise rules upon the enterprise-wide policy inherited as each array-wide policy; and, wherein the array-wide policy provided by each of the at least one array policy object other than the one or more of the at least one array policy object inheriting the enterprise-wide policy includes a plurality of second array rules not initially equal to the plurality of enterprise rules, each second array rule having a rule type selected from the positive rule type and the negative rule type.

18. The system of claim 17, wherein the array-wide policy provided by each of the one or more of the at least one array policy object includes a plurality of array rules at least initially equal to the plurality of enterprise rules upon the enterprise-wide policy inherited as each array-wide policy.

19. The system of claim 17, where the array-wide policy provided by each of the one or more of the at least one array policy object further includes one or more other first array rules, each of the one or more other first may rules having the negative rule type.

20. The system of claim 17, further comprising at least one node policy object, each node policy object providing a node policy governing resource access for a corresponding node of the plurality of nodes other than the one or more of the plurality of nodes organized within the plurality of arrays.

21. The system of claim 20, wherein the node policy includes a plurality of node rules, each node rule governing at least one of access to a particular resource and use of a particular protocol, each node rule having a rule type selected from a positive rule type and a negative rule type, the positive rule type explicitly allowing at least one of access and use and the negative rule type explicitly denying at least one of access and use.

* * * * *

UNITED STATES PATENT AND TRADEMARK OFFICE

CERTIFICATE OF CORRECTION

PATENT NO. : 7,013,332 B2
APPLICATION NO. : 09/681106
DATED : March 14, 2006
INVENTOR(S) : Guy Friedel et al.

It is certified that error appears in the above-identified patent and that said Letters Patent is hereby corrected as shown below:

On the face page, in field (56), under “Other Publications”, in column 2, line 11, after “CA” insert -- , --.

On Sheet 1 of 12, please replace Fig. 1(a) with the following figure:

ARRAY ONLY

FIG 1(a)

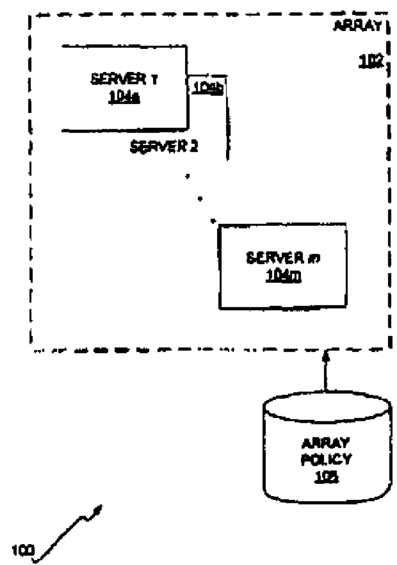

UNITED STATES PATENT AND TRADEMARK OFFICE

CERTIFICATE OF CORRECTION

PATENT NO. : 7,013,332 B2
APPLICATION NO. : 09/681106
DATED : March 14, 2006
INVENTOR(S) : Guy Friedel et al.

Figure 1B:
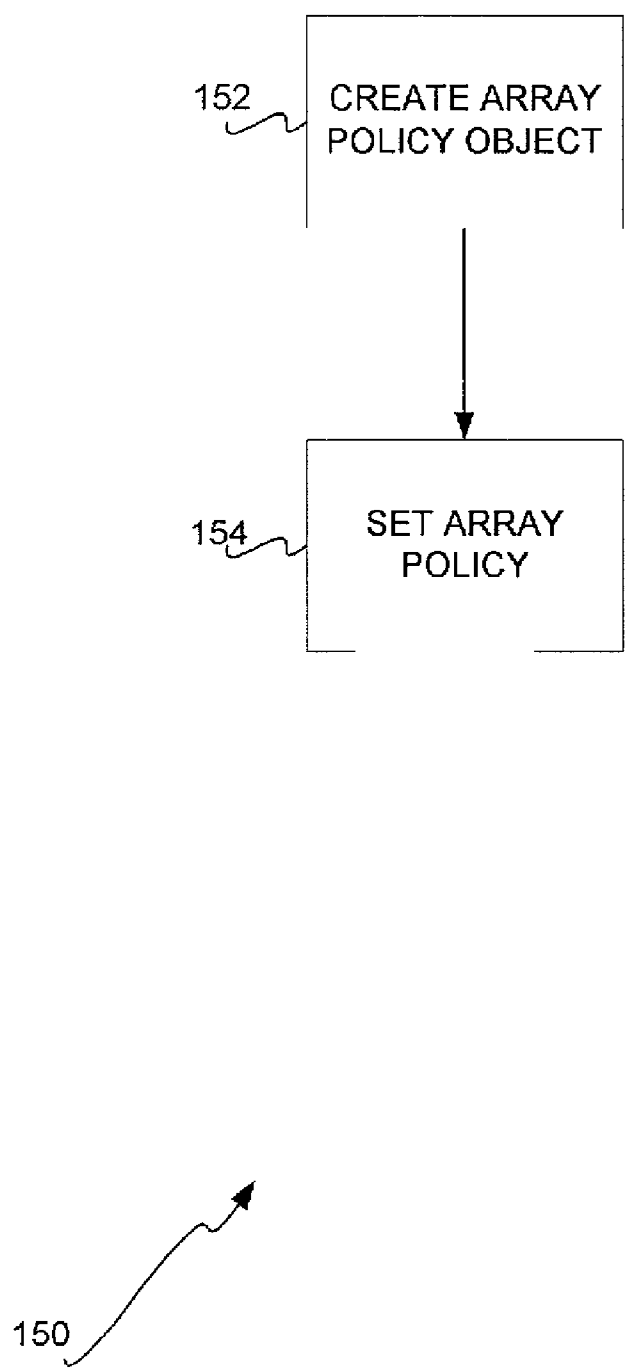

It is certified that error appears in the above-identified patent and that said Letters Patent is hereby corrected as shown below:

On Sheet 2 of 12, please replace FIG 1(b) with the following figure:

ARRAY ONLY

FIG 1(b)

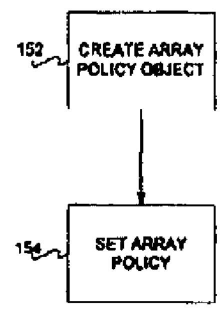

150

UNITED STATES PATENT AND TRADEMARK OFFICE

CERTIFICATE OF CORRECTION

PATENT NO. : 7,013,332 B2
APPLICATION NO. : 09/681106
DATED : March 14, 2006
INVENTOR(S) : Guy Friedel et al.

It is certified that error appears in the above-identified patent and that said Letters Patent is hereby corrected as shown below:

On Sheet 3 of 12, please replace FIG 2(a) with the following figure:

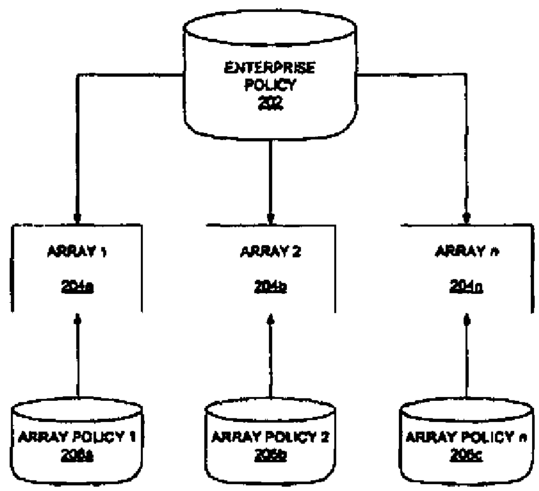

UNITED STATES PATENT AND TRADEMARK OFFICE

CERTIFICATE OF CORRECTION

PATENT NO. : 7,013,332 B2
APPLICATION NO. : 09/681106
DATED : March 14, 2006
INVENTOR(S) : Guy Friedel et al.

Figure 2C:
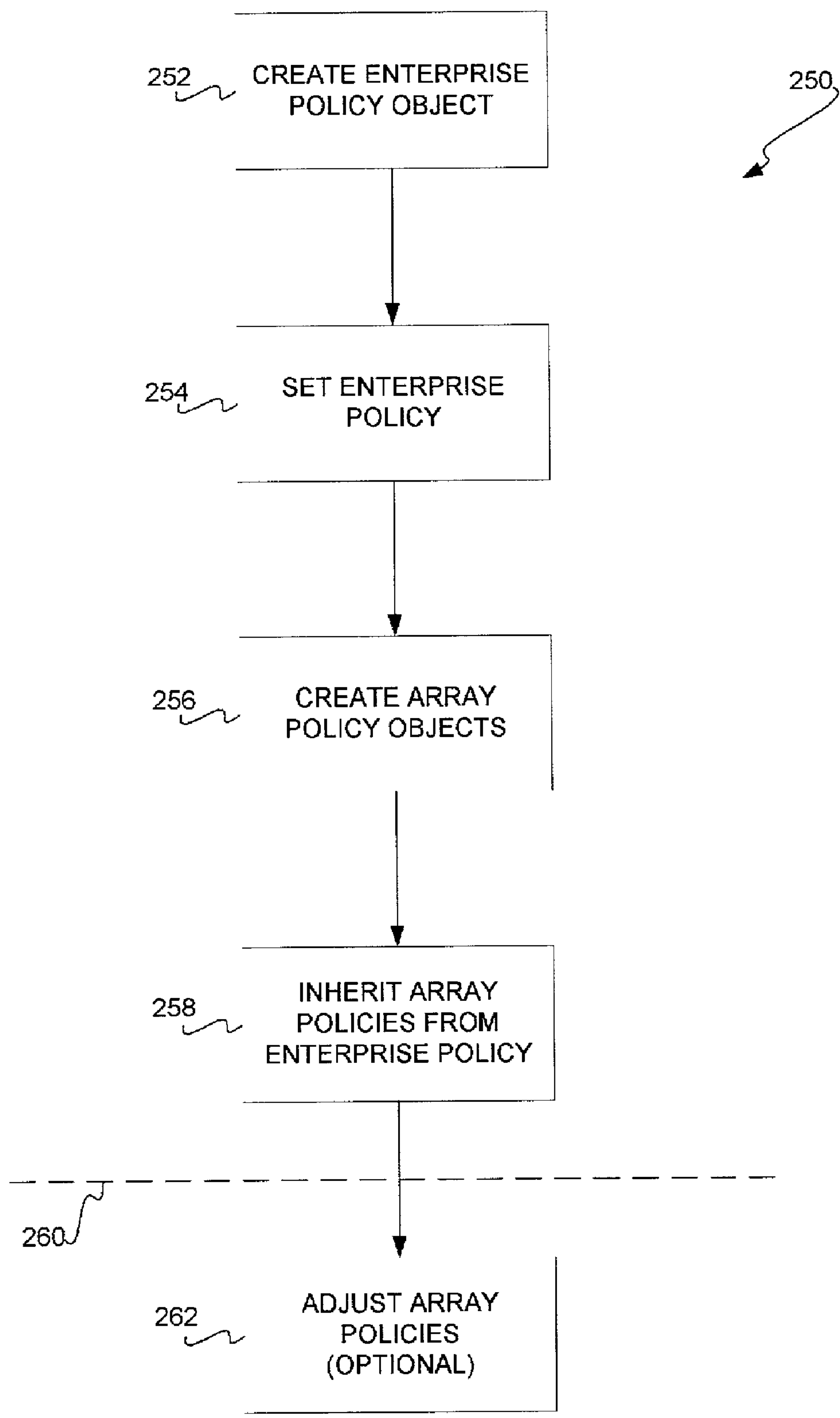

It is certified that error appears in the above-identified patent and that said Letters Patent is hereby corrected as shown below:

On Sheet 5 of 12, please replace FIG 2(c) with the following figure:

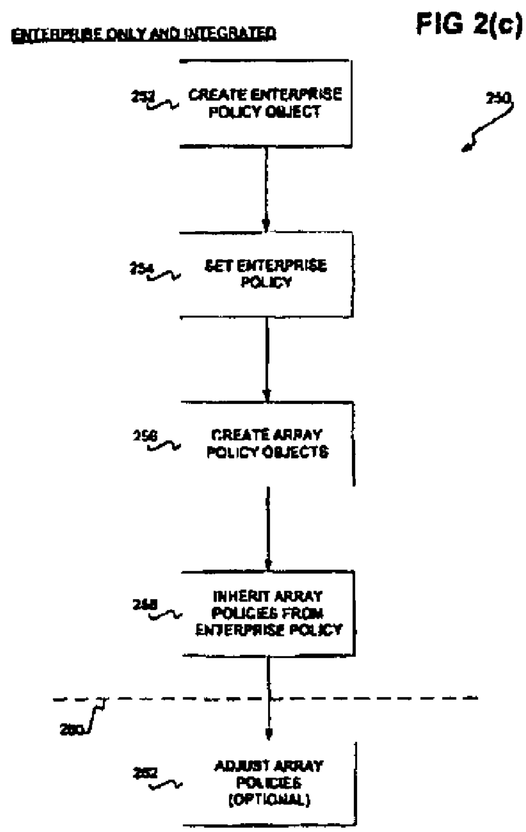

CERTIFICATE OF CORRECTION

PATENT NO. : 7,013,332 B2
APPLICATION NO. : 09/681106
DATED : March 14, 2006
INVENTOR(S) : Guy Friedel et al.

Figure 3A:
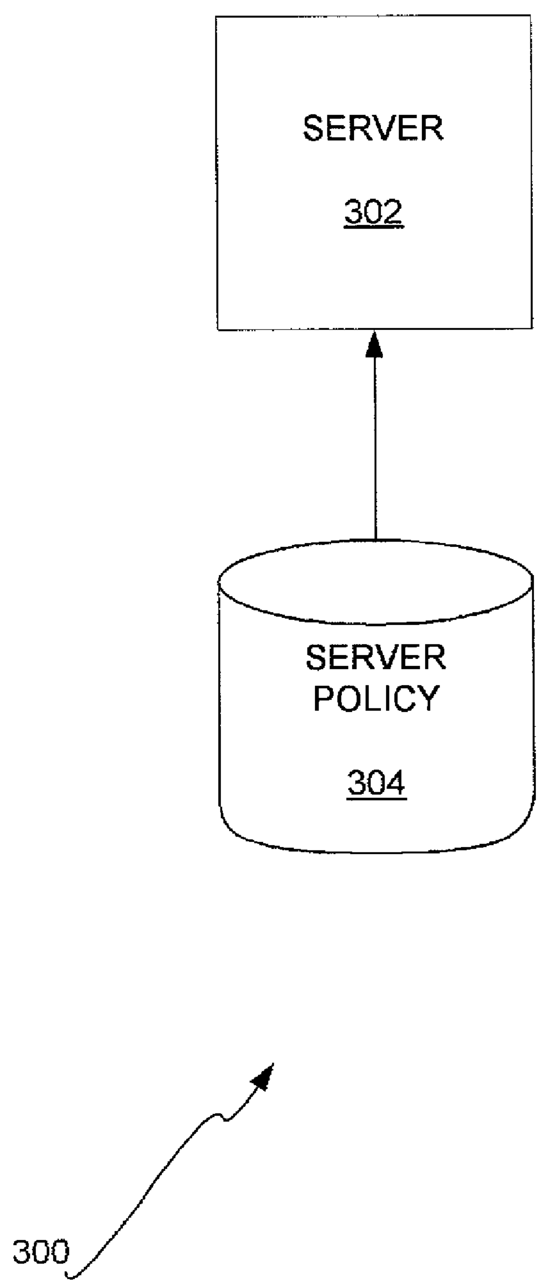
FIG. 3(*a*) is a diagram showing a stand-alone mode of the invention.

It is certified that error appears in the above-identified patent and that said Letters Patent is hereby corrected as shown below:

On Sheet 6 of 12, please replace FIG 3(a) with the following figure:

SERVER ONLY

FIG 3(a)

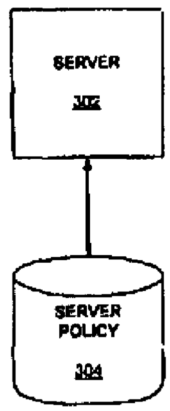

300

UNITED STATES PATENT AND TRADEMARK OFFICE
CERTIFICATE OF CORRECTION

PATENT NO. : 7,013,332 B2
APPLICATION NO. : 09/681106
DATED : March 14, 2006
INVENTOR(S) : Guy Friedel et al.

Figure 3B:
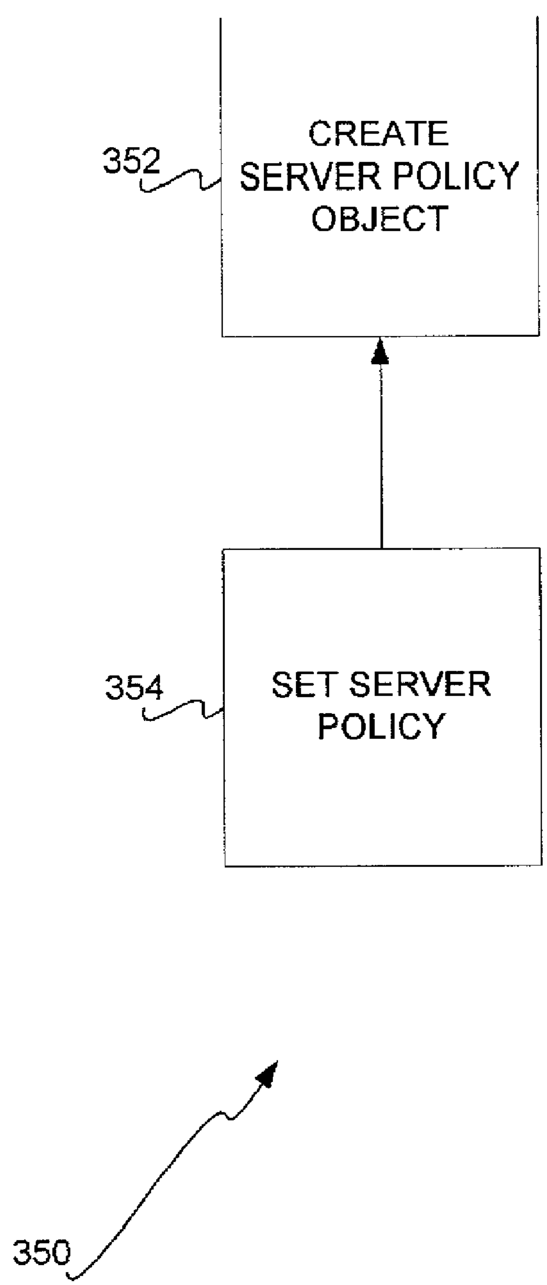

It is certified that error appears in the above-identified patent and that said Letters Patent is hereby corrected as shown below:

On Sheet 7 of 12, please replace FIG 3(b) with the following figure:

SERVER ONLY

FIG 3(b)

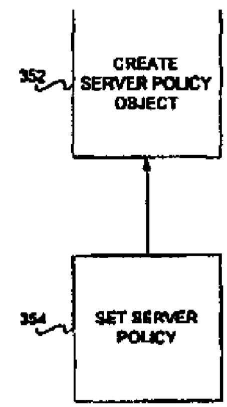

350

UNITED STATES PATENT AND TRADEMARK OFFICE

CERTIFICATE OF CORRECTION

PATENT NO. : 7,013,332 B2
APPLICATION NO. : 09/681106
DATED : March 14, 2006
INVENTOR(S) : Guy Friedel et al.

It is certified that error appears in the above-identified patent and that said Letters Patent is hereby corrected as shown below:

On Sheet 8 of 12, please replace FIG 4 with the following figure:

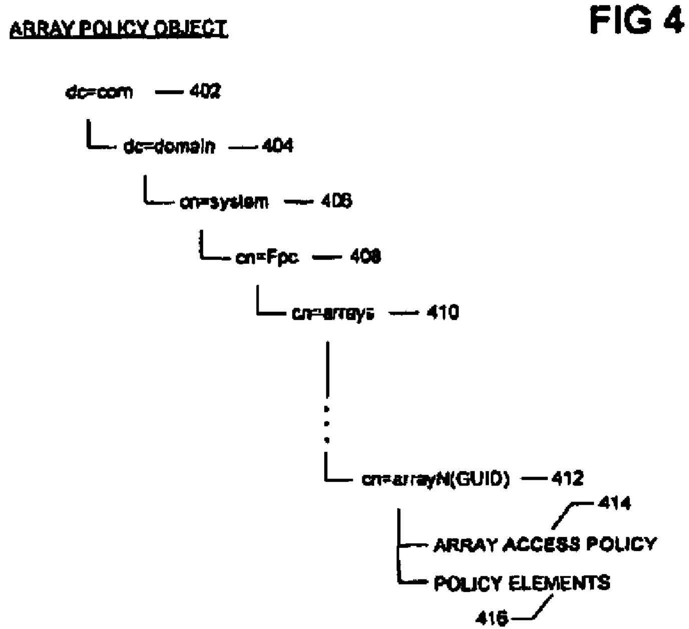

UNITED STATES PATENT AND TRADEMARK OFFICE

CERTIFICATE OF CORRECTION

PATENT NO. : 7,013,332 B2
APPLICATION NO. : 09/681106
DATED : March 14, 2006
INVENTOR(S) : Guy Friedel et al.

It is certified that error appears in the above-identified patent and that said Letters Patent is hereby corrected as shown below:

On Sheet 9 of 12, please replace FIG 5 with the following figure:

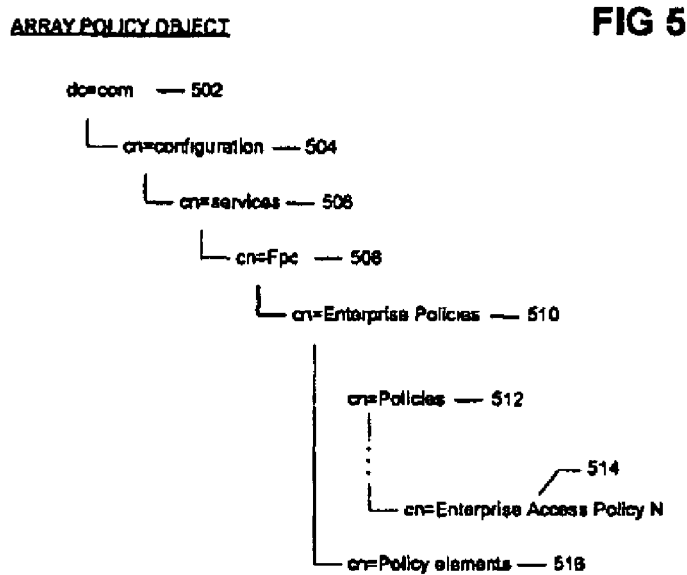

UNITED STATES PATENT AND TRADEMARK OFFICE
CERTIFICATE OF CORRECTION

PATENT NO. : 7,013,332 B2
APPLICATION NO. : 09/681106
DATED : March 14, 2006
INVENTOR(S) : Guy Friedel et al.

It is certified that error appears in the above-identified patent and that said Letters Patent is hereby corrected as shown below:

On Sheet 10 of 12, please replace FIG 6 with the following figure:

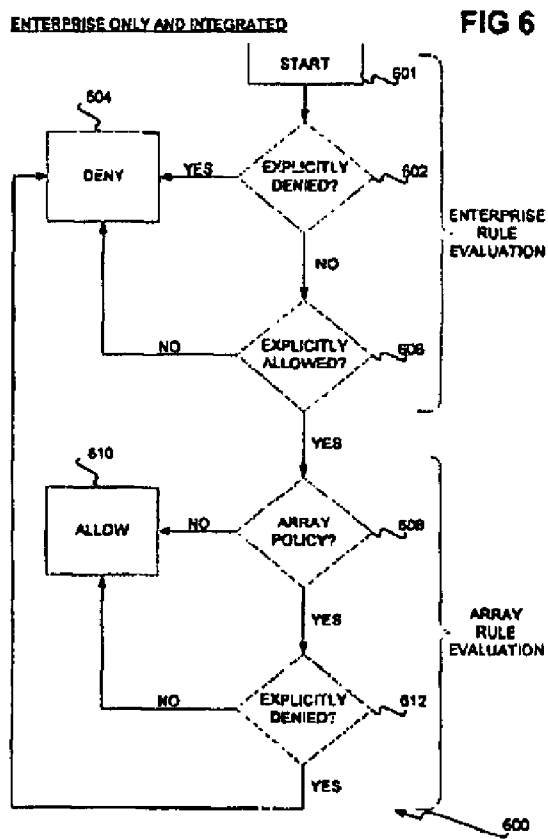

UNITED STATES PATENT AND TRADEMARK OFFICE
CERTIFICATE OF CORRECTION

PATENT NO. : 7,013,332 B2
APPLICATION NO. : 09/681106
DATED : March 14, 2006
INVENTOR(S) : Guy Friedel et al.

It is certified that error appears in the above-identified patent and that said Letters Patent is hereby corrected as shown below:

On Sheet 11 of 12, please replace FIG 7 with the following figure:

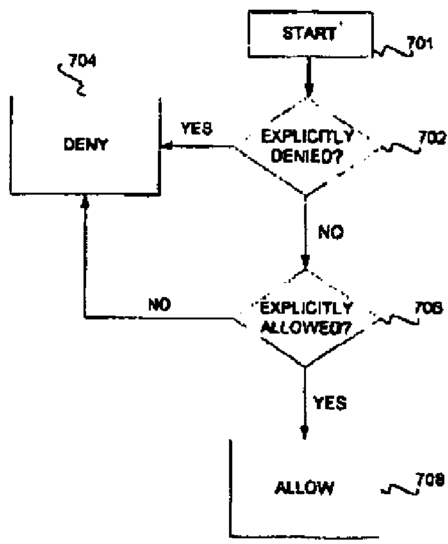

CERTIFICATE OF CORRECTION

PATENT NO. : 7,013,332 B2
APPLICATION NO. : 09/681106
DATED : March 14, 2006
INVENTOR(S) : Guy Friedel et al.

It is certified that error appears in the above-identified patent and that said Letters Patent is hereby corrected as shown below:

In column 12, line 18, in Claim 1, after “each of one” delete “of” and insert -- or --, therefor.

In column 13, line 61, in Claim 13, delete “govering” and insert -- governing --, therefor.

In column 13, line 65, in Claim 13, delete “time” and insert -- type --, therefor.

In column 14, line 18, in Claim 15, delete “byte” and insert -- by the --, therefor.

In column 14, line 59, in Claim 17, after “the” insert -- at --.

In column 15, line 12, in Claim 19, delete “may” and insert -- array --, therefor.

Signed and Sealed this

Twenty-ninth Day of September, 2009

David J. Kappos
*Director of the United States Patent and Trademark Office*

UNITED STATES PATENT AND TRADEMARK OFFICE

CERTIFICATE OF CORRECTION

PATENT NO. : 7,013,332 B2
APPLICATION NO. : 09/681106
DATED : March 14, 2006
INVENTOR(S) : Guy Friedel et al.

It is certified that error appears in the above-identified patent and that said Letters Patent is hereby corrected as shown below:

Delete the title page and substitute therefore the attached title page.

On the face page, in field (56), under "Other Publications", in column 2, line 11, after "CA" insert -- , --.

On Sheet 1 of 12, please replace Fig. 1(a) with the following figure:

ARRAY ONLY

FIG 1(a)

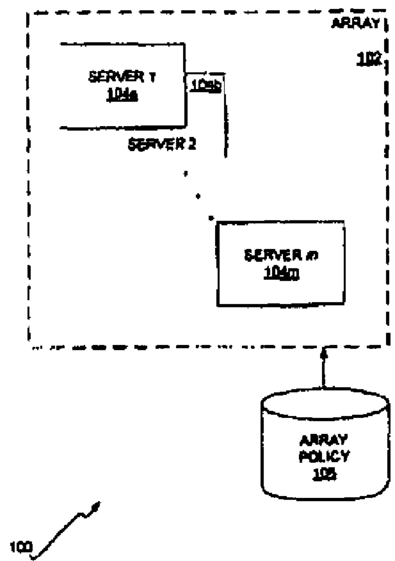

UNITED STATES PATENT AND TRADEMARK OFFICE

CERTIFICATE OF CORRECTION

PATENT NO. : 7,013,332 B2
APPLICATION NO. : 09/681106
DATED : March 14, 2006
INVENTOR(S) : Guy Friedel et al.

It is certified that error appears in the above-identified patent and that said Letters Patent is hereby corrected as shown below:

On Sheet 2 of 12, please replace FIG 1(b) with the following figure:

ARRAY ONLY

FIG 1(b)

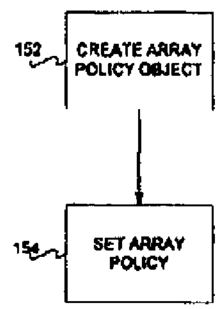

150

UNITED STATES PATENT AND TRADEMARK OFFICE
CERTIFICATE OF CORRECTION

PATENT NO. : 7,013,332 B2
APPLICATION NO. : 09/681106
DATED : March 14, 2006
INVENTOR(S) : Guy Friedel et al.

It is certified that error appears in the above-identified patent and that said Letters Patent is hereby corrected as shown below:

On Sheet 3 of 12, please replace FIG 2(a) with the following figure:

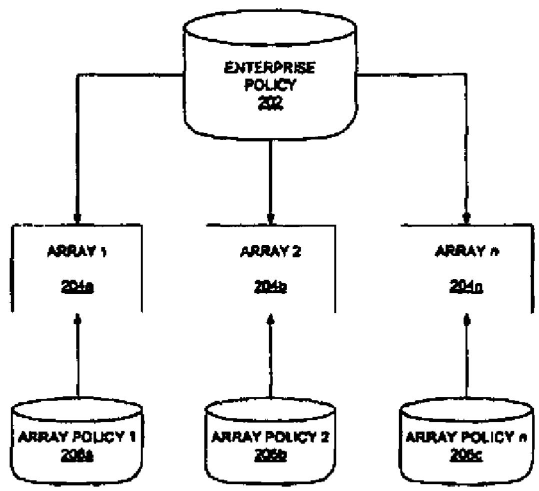

CERTIFICATE OF CORRECTION

PATENT NO. : 7,013,332 B2
APPLICATION NO. : 09/681106
DATED : March 14, 2006
INVENTOR(S) : Guy Friedel et al.

It is certified that error appears in the above-identified patent and that said Letters Patent is hereby corrected as shown below:

On Sheet 5 of 12, please replace FIG 2(c) with the following figure:

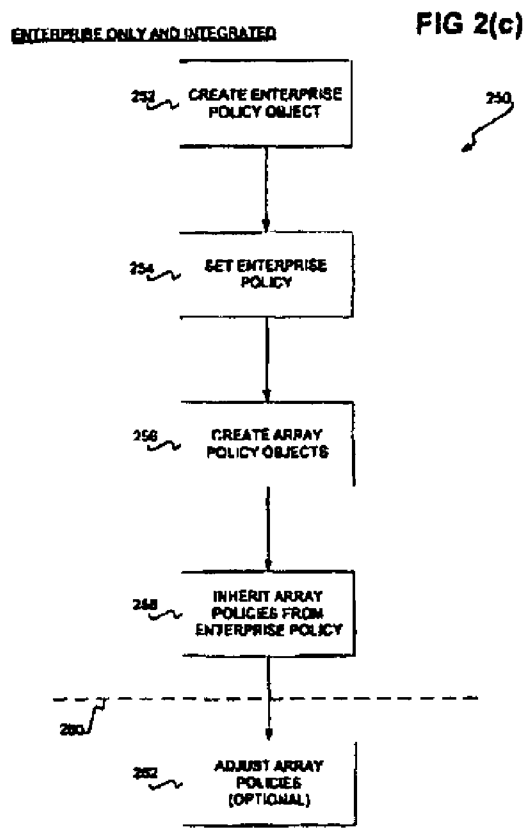

UNITED STATES PATENT AND TRADEMARK OFFICE

CERTIFICATE OF CORRECTION

PATENT NO. : 7,013,332 B2
APPLICATION NO. : 09/681106
DATED : March 14, 2006
INVENTOR(S) : Guy Friedel et al.

It is certified that error appears in the above-identified patent and that said Letters Patent is hereby corrected as shown below:

On Sheet 6 of 12, please replace FIG 3(a) with the following figure:

SERVER ONLY

FIG 3(a)

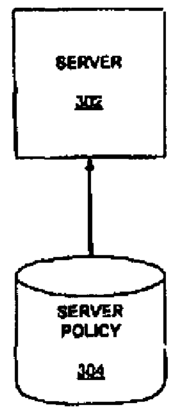

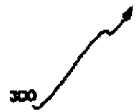

UNITED STATES PATENT AND TRADEMARK OFFICE

CERTIFICATE OF CORRECTION

PATENT NO. : 7,013,332 B2 
APPLICATION NO. : 09/681106
DATED : March 14, 2006
INVENTOR(S) : Guy Friedel et al.

It is certified that error appears in the above-identified patent and that said Letters Patent is hereby corrected as shown below:

On Sheet 7 of 12, please replace FIG 3(b) with the following figure:

SERVER ONLY

FIG 3(b)

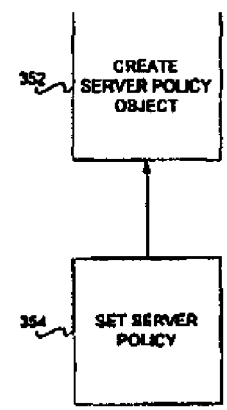

350

UNITED STATES PATENT AND TRADEMARK OFFICE

CERTIFICATE OF CORRECTION

PATENT NO. : 7,013,332 B2 
APPLICATION NO. : 09/681106
DATED : March 14, 2006
INVENTOR(S) : Guy Friedel et al.

It is certified that error appears in the above-identified patent and that said Letters Patent is hereby corrected as shown below:

On Sheet 8 of 12, please replace FIG 4 with the following figure:

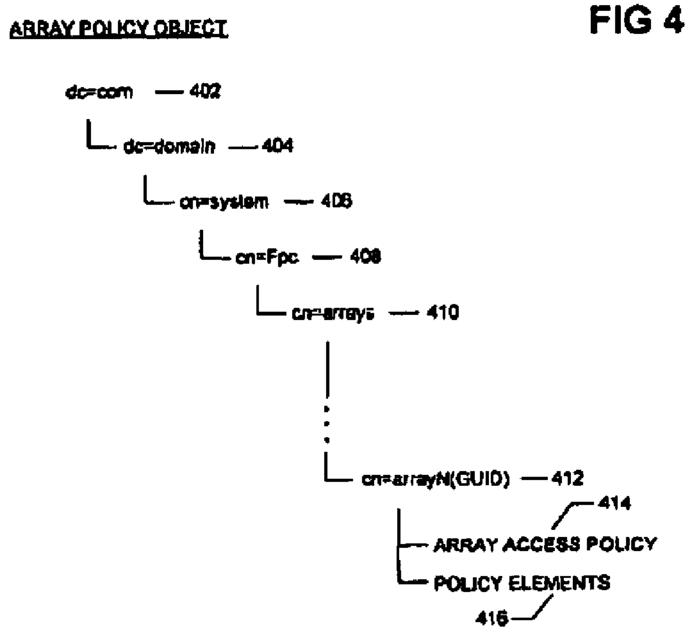

UNITED STATES PATENT AND TRADEMARK OFFICE
CERTIFICATE OF CORRECTION

PATENT NO. : 7,013,332 B2 
APPLICATION NO. : 09/681106
DATED : March 14, 2006
INVENTOR(S) : Guy Friedel et al.

It is certified that error appears in the above-identified patent and that said Letters Patent is hereby corrected as shown below:

On Sheet 9 of 12, please replace FIG 5 with the following figure:

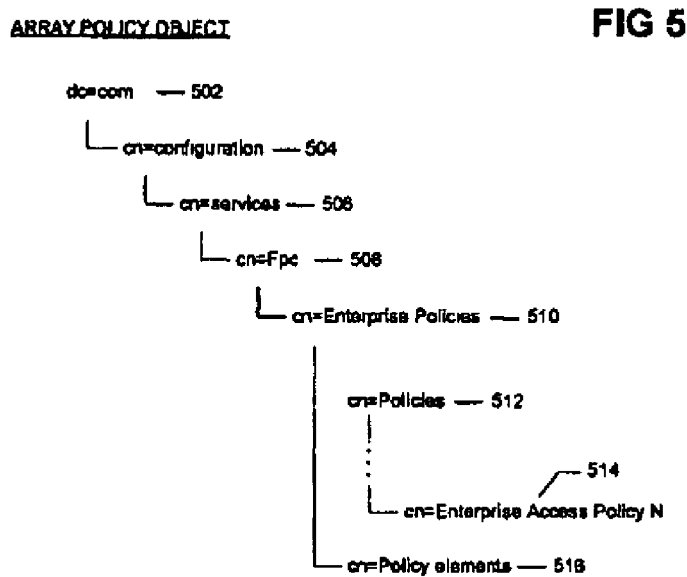

UNITED STATES PATENT AND TRADEMARK OFFICE

CERTIFICATE OF CORRECTION

PATENT NO. : 7,013,332 B2
APPLICATION NO. : 09/681106
DATED : March 14, 2006
INVENTOR(S) : Guy Friedel et al.

It is certified that error appears in the above-identified patent and that said Letters Patent is hereby corrected as shown below:

On Sheet 10 of 12, please replace FIG 6 with the following figure:

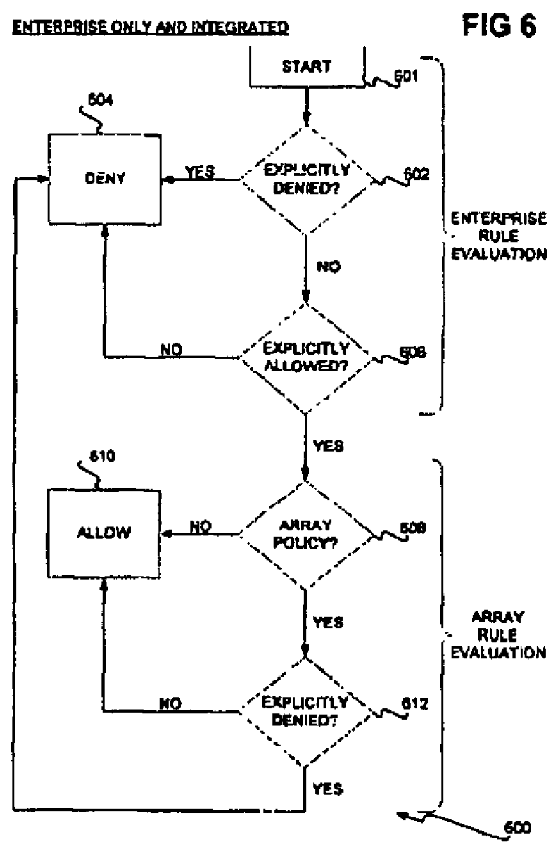

UNITED STATES PATENT AND TRADEMARK OFFICE

CERTIFICATE OF CORRECTION

PATENT NO. : 7,013,332 B2
APPLICATION NO. : 09/681106
DATED : March 14, 2006
INVENTOR(S) : Guy Friedel et al.

It is certified that error appears in the above-identified patent and that said Letters Patent is hereby corrected as shown below:

On Sheet 11 of 12, please replace FIG 7 with the following figure:

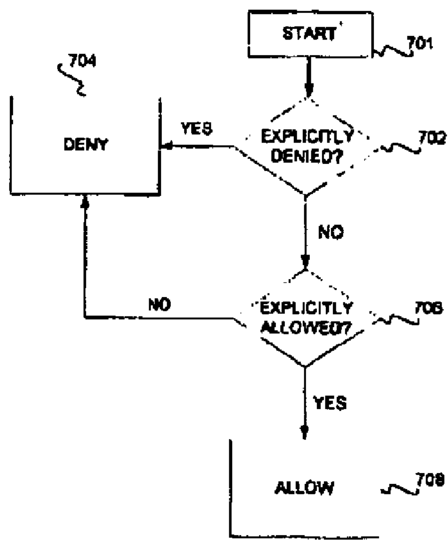

UNITED STATES PATENT AND TRADEMARK OFFICE
CERTIFICATE OF CORRECTION

PATENT NO. : 7,013,332 B2
APPLICATION NO. : 09/681106
DATED : March 14, 2006
INVENTOR(S) : Guy Friedel et al.

It is certified that error appears in the above-identified patent and that said Letters Patent is hereby corrected as shown below:

In column 12, line 18, in Claim 1, after "each of one" delete "of" and insert -- or --, therefor.

In column 13, line 61, in Claim 13, delete "govering" and insert -- governing --, therefor.

In column 13, line 65, in Claim 13, delete "time" and insert -- type --, therefor.

In column 14, line 18, in Claim 15, delete "byte" and insert -- by the --, therefor.

In column 14, line 59, in Claim 17, after "the" insert -- at --.

In column 15, line 12, in Claim 19, delete "may" and insert -- array --, therefor.

This certificate supersedes the Certificate of Correction issued September 29, 2009.

Signed and Sealed this

Third Day of November, 2009

David J. Kappos
*Director of the United States Patent and Trademark Office*

(12) United States Patent
Friedel et al.

(10) Patent No.: US 7,013,332 B2
(45) Date of Patent: Mar. 14, 2006

(54) DISTRIBUTED POLICY MODEL FOR ACCESS CONTROL

(75) Inventors: Guy Friedel, Bellevue, WA (US); Ariel Katz, Redmond, WA (US); Yaron Shamir, Zichron Yaacov (IL); Abraham Nathan, Haifa (IL)

(73) Assignee: Microsoft Corporation, Redmond, WA (US)

( * ) Notice: Subject to any disclaimer, the term of this patent is extended or adjusted under 35 U.S.C. 154(b) by 739 days.

(21) Appl. No.: 09/681,106

(22) Filed: Jan. 9, 2001

(65) Prior Publication Data

US 2002/0138631 A1 Sep. 26, 2002

(51) Int. Cl.
*G06F 15/173* (2006.01)

(52) U.S. Cl. ..................... 709/223; 709/224; 709/225; 713/201; 707/10

(58) Field of Classification Search ........ 709/223–225, 709/229; 713/201; 707/3, 10, 200
See application file for complete search history.

(56) References Cited

U.S. PATENT DOCUMENTS

| | | | | |
|---|---|---|---|---|
| 5,787,427 | A * | 7/1998 | Benantar et al. | 707/9 |
| 5,911,143 | A * | 6/1999 | Deinhart et al. | 707/103 R |
| 5,991,877 | A * | 11/1999 | Luckenbaugh | 713/200 |
| 6,466,932 | B1 * | 10/2002 | Dennis et al. | 707/3 |
| 6,647,388 | B1 * | 11/2003 | Numao et al. | 707/9 |
| 6,708,276 | B1 * | 3/2004 | Yarsa et al. | 713/201 |
| 6,718,380 | B1 * | 4/2004 | Mohaban et al. | 709/223 |
| 2002/0002684 | A1 * | 1/2002 | Fox et al. | 713/200 |
| 2003/0023587 | A1 * | 1/2003 | Dennis et al. | 707/3 |

OTHER PUBLICATIONS

T.C. Ting, S.A> Demurjian and M.Y. Hu, Requirements, Capabilities and Functionalities of User-Role Based security for an Object-Oriented Design Model, Jun. 25, 1997, pp. 275-296.*

Dirk Jonscher, Extending access control with duties— realized by active mechanisms, Jun. 25, 1997, pp. 91-111.*

Greenwald, A new security policy for distributed resource management and access control, Proceedings of the UCLA conference on New security paradigms workshops Sep. 17-20, 1996, Lake Arrowhead, CA USA.

Nevex Policy Suite, Technical Brief, http://www.nevex.com/Technical%20Brief.html, date unknown.

* cited by examiner

*Primary Examiner*—Ario Etienne
*Assistant Examiner*—LaShonda Jacobs
(74) *Attorney, Agent, or Firm*—Lee & Hayes, PLLC

(57) ABSTRACT

A distributed policy model for access control is disclosed. In an enterprise-only mode, each node within a networking environment has its resource access governed by the same enterprise-wide policy. The enterprise-wide policy is set through creation of one or more enterprise policy objects. In an integrated mode, nodes are organized in a number of arrays. Each array has an array-wide policy set through creation of an array policy object. Each array-wide policy initially inherits the enterprise-wide policy. Additional resource access and protocol use restrictions can be added to the individual array-wide policies. In an array-only mode, each array has an array-wide policy also set through creation of an array policy object, but the policy does not necessarily initially inherit an enterprise-wide policy. In a stand-alone mode, a single server has its own policy.

21 Claims, 12 Drawing Sheets